United States Patent
Fox et al.

(10) Patent No.: US 11,378,682 B2
(45) Date of Patent: Jul. 5, 2022

(54) SYNTHETIC APERTURE RADAR IMAGING APPARATUS AND METHODS FOR MOVING TARGETS

(71) Applicants: Urthecast Corp, Vancouver (CA); King Abdullah City of Science and Technology, Riyadh (SA)

(72) Inventors: Peter Allen Fox, Burnaby (CA); Keith Dennis Richard Beckett, New Westminster (CA)

(73) Assignee: SPACEALPHA INSIGHTS CORP., Vancouver (CA)

( * ) Notice: Subject to any disclaimer, the term of this patent is extended or adjusted under 35 U.S.C. 154(b) by 56 days.

(21) Appl. No.: 16/616,364

(22) PCT Filed: May 23, 2018

(86) PCT No.: PCT/US2018/034146
§ 371 (c)(1),
(2) Date: Nov. 22, 2019

(87) PCT Pub. No.: WO2018/217902
PCT Pub. Date: Nov. 29, 2018

(65) Prior Publication Data
US 2020/0096630 A1    Mar. 26, 2020

Related U.S. Application Data

(66) Substitute for application No. 62/510,191, filed on May 23, 2017.

(51) Int. Cl.
*G01S 13/90* (2006.01)

(52) U.S. Cl.
CPC ...... *G01S 13/9029* (2013.01); *G01S 13/9056* (2019.05)

(58) Field of Classification Search
CPC . G01S 13/9029; G01S 13/9056; G01S 13/904
See application file for complete search history.

(56) References Cited

U.S. PATENT DOCUMENTS

| 3,193,830 A | 7/1965 | Provencher |
| 3,241,140 A | 3/1966 | Raabe |

(Continued)

FOREIGN PATENT DOCUMENTS

| CA | 2428513 C | 7/2003 |
| CA | 2488909 C | 5/2005 |

(Continued)

OTHER PUBLICATIONS

China office action and search report from related case CN 201680045476.4 dated Jan. 6, 2020, with English translation.
(Continued)

*Primary Examiner* — Timothy X Pham
(74) *Attorney, Agent, or Firm* — Grossman, Tucker, Perreault & Pfleger, PLLC

(57) ABSTRACT

A synthetic aperture radar (SAR) system may employ SAR imaging to advantageously estimate or monitor a transit characteristic (e.g., velocity, acceleration) of a vehicle, for example a ground based vehicle or water based vehicle. A dual-beam SAR antenna illuminate a moving target with a first radar beam and a second radar beam at an angular offset relative to the first radar beam. Pulses may be transmitted and backscattered energy received simultaneously by the SAR transceiver via the first and second radar beams. A SAR data processor may generate a first image from the first radar beam and a second image from the second radar beam, co-registering the first and second images, comparing the location of the moving target in the first and second images, and estimate a velocity of the moving target based at least in part on the angular offset.

14 Claims, 5 Drawing Sheets

(56) References Cited

U.S. PATENT DOCUMENTS

| | | |
|---|---|---|
| 3,460,139 A | 8/1969 | Rittenbach |
| 3,601,529 A | 8/1971 | Dischert |
| 3,715,962 A | 2/1973 | Yost, Jr. |
| 3,808,357 A | 4/1974 | Nakagaki et al. |
| 4,163,247 A | 7/1979 | Bock et al. |
| 4,178,581 A | 12/1979 | Willey, Sr. |
| 4,214,264 A | 7/1980 | Hayward et al. |
| 4,246,598 A | 1/1981 | Bock et al. |
| 4,404,586 A | 9/1983 | Tabei |
| 4,514,755 A | 4/1985 | Tabei |
| 4,656,508 A | 4/1987 | Yokota |
| 4,803,645 A | 2/1989 | Ohtomo et al. |
| 4,823,186 A | 4/1989 | Muramatsu |
| 4,924,229 A | 5/1990 | Eichel et al. |
| 4,951,136 A | 8/1990 | Drescher et al. |
| 4,989,008 A | 1/1991 | Fajisaka et al. |
| 5,057,843 A | 10/1991 | Dubois et al. |
| 5,059,966 A | 10/1991 | Fujisaka et al. |
| 5,093,663 A | 3/1992 | Baechtiger et al. |
| 5,173,949 A | 12/1992 | Peregrim et al. |
| 5,248,979 A | 9/1993 | Orme et al. |
| 5,313,210 A | 5/1994 | Gail |
| 5,486,830 A | 1/1996 | Axline, Jr. et al. |
| 5,489,907 A | 2/1996 | Zink et al. |
| 5,512,899 A | 4/1996 | Osawa et al. |
| 5,546,091 A | 8/1996 | Haugen et al. |
| 5,552,787 A | 9/1996 | Schuler et al. |
| 5,646,623 A | 7/1997 | Walters et al. |
| 5,745,069 A | 4/1998 | Gail |
| 5,760,899 A | 6/1998 | Eismann |
| 5,790,188 A | 8/1998 | Sun |
| 5,821,895 A | 10/1998 | Hounam et al. |
| 5,883,584 A | 3/1999 | Langemann et al. |
| 5,926,125 A | 7/1999 | Wood |
| 5,945,940 A | 8/1999 | Cuomo |
| 5,949,914 A | 9/1999 | Yuen |
| 5,952,971 A | 9/1999 | Strickland |
| 5,973,634 A | 10/1999 | Kare |
| 6,007,027 A | 12/1999 | Diekelman et al. |
| 6,122,404 A | 9/2000 | Barter et al. |
| 6,241,192 B1 | 6/2001 | Kondo et al. |
| 6,255,987 B1 | 7/2001 | Lancashire et al. |
| 6,259,396 B1 | 7/2001 | Pham et al. |
| 6,347,762 B1 | 2/2002 | Sims et al. |
| 6,359,584 B1 | 3/2002 | Cordey et al. |
| 6,502,790 B1 | 1/2003 | Murphy |
| 6,577,266 B1 | 6/2003 | Axline |
| 6,614,813 B1 | 9/2003 | Dudley et al. |
| 6,633,253 B2 | 10/2003 | Cataldo |
| 6,678,048 B1 | 1/2004 | Rienstra et al. |
| 6,741,250 B1 | 5/2004 | Furlan et al. |
| 6,781,540 B1 | 8/2004 | MacKey et al. |
| 6,781,707 B2 | 8/2004 | Peters et al. |
| 6,831,688 B2 | 12/2004 | Lareau et al. |
| 6,861,996 B2 | 3/2005 | Jeong |
| 6,864,827 B1 | 3/2005 | Tise et al. |
| 6,888,490 B1 | 5/2005 | Brovko et al. |
| 6,914,553 B1 | 7/2005 | Beadle et al. |
| 6,919,839 B1 | 7/2005 | Beadle et al. |
| 6,970,142 B1 | 11/2005 | Pleva et al. |
| 7,015,855 B1 | 3/2006 | Medl et al. |
| 7,019,777 B2 | 3/2006 | Sun |
| 7,034,746 B1 | 4/2006 | McMakin et al. |
| 7,064,702 B1 | 6/2006 | Abatzoglou |
| 7,095,359 B2 | 8/2006 | Matsuoka et al. |
| 7,123,169 B2 | 10/2006 | Farmer et al. |
| 7,149,366 B1 | 12/2006 | Sun |
| 7,158,878 B2 | 1/2007 | Rasmussen et al. |
| 7,167,280 B2 | 1/2007 | Bogdanowicz et al. |
| 7,212,149 B2 | 5/2007 | Abatzoglou et al. |
| 7,218,268 B2 | 5/2007 | VandenBerg |
| 7,242,342 B2 | 7/2007 | Wu et al. |
| 7,270,299 B1 | 9/2007 | Murphy |
| 7,292,723 B2 | 11/2007 | Tedesco et al. |
| 7,298,922 B1 | 11/2007 | Lindgren et al. |
| 7,327,305 B2 | 2/2008 | Loehner et al. |
| 7,348,917 B2 | 3/2008 | Stankwitz et al. |
| 7,379,612 B2 | 5/2008 | Milanfar et al. |
| 7,385,705 B1 | 6/2008 | Hoctor et al. |
| 7,412,107 B2 | 8/2008 | Milanfar et al. |
| 7,414,706 B2 | 8/2008 | Nichols et al. |
| 7,417,210 B2 | 8/2008 | Ax, Jr. et al. |
| 7,423,577 B1 | 9/2008 | McIntire et al. |
| 7,468,504 B2 | 12/2008 | Halvis et al. |
| 7,475,054 B2 | 1/2009 | Hearing et al. |
| 7,477,802 B2 | 1/2009 | Milanfar et al. |
| 7,486,221 B2 | 2/2009 | Meyers et al. |
| 7,536,365 B2 | 5/2009 | Aboutalib |
| 7,545,309 B1 | 6/2009 | McIntire et al. |
| 7,548,185 B2 | 6/2009 | Sheen et al. |
| 7,570,202 B2 | 8/2009 | Raney |
| 7,599,790 B2 | 10/2009 | Rasmussen et al. |
| 7,602,997 B2 | 10/2009 | Young |
| 7,623,064 B2 | 11/2009 | Calderbank et al. |
| 7,646,326 B2 | 1/2010 | Antonik et al. |
| 7,698,668 B2 | 4/2010 | Balasubramanian et al. |
| 7,705,766 B2 | 4/2010 | Lancashire et al. |
| 7,733,961 B2 | 6/2010 | O'Hara et al. |
| 7,746,267 B2 | 6/2010 | Raney |
| 7,769,229 B2 | 8/2010 | O'Brien et al. |
| 7,769,241 B2 | 8/2010 | Adams, Jr. et al. |
| 7,781,716 B2 | 8/2010 | Anderson et al. |
| 7,825,847 B2 | 11/2010 | Fujimura |
| 7,830,430 B2 | 11/2010 | Adams, Jr. et al. |
| 7,844,127 B2 | 11/2010 | Adams, Jr. et al. |
| 7,855,740 B2 | 12/2010 | Hamilton, Jr. et al. |
| 7,855,752 B2 | 12/2010 | Baker et al. |
| 7,876,257 B2 | 1/2011 | Vetro et al. |
| 7,884,752 B2 | 2/2011 | Hellsten et al. |
| 7,897,902 B2 | 3/2011 | Katzir et al. |
| 7,911,372 B2 | 3/2011 | Nelson |
| 7,924,210 B2 | 4/2011 | Johnson |
| 7,936,949 B2 | 5/2011 | Riley et al. |
| 7,940,282 B2 | 5/2011 | Milanfar et al. |
| 7,940,959 B2 | 5/2011 | Rubenstein |
| 7,991,226 B2 | 8/2011 | Schultz et al. |
| 8,013,778 B2 | 9/2011 | Grafmueller et al. |
| 8,031,258 B2 | 10/2011 | Enge et al. |
| 8,040,273 B2 | 10/2011 | Tomich et al. |
| 8,045,024 B2 | 10/2011 | Kumar et al. |
| 8,049,657 B2 | 11/2011 | Prats et al. |
| 8,053,720 B2 | 11/2011 | Han et al. |
| 8,059,023 B2 | 11/2011 | Richard |
| 8,068,153 B2 | 11/2011 | Kumar et al. |
| 8,073,246 B2 | 12/2011 | Adams, Jr. et al. |
| 8,078,009 B2 | 12/2011 | Riley et al. |
| 8,090,312 B2 | 1/2012 | Robinson |
| 8,094,960 B2 | 1/2012 | Riley et al. |
| 8,111,307 B2 | 2/2012 | Deever et al. |
| 8,115,666 B2 | 2/2012 | Moussally et al. |
| 8,116,576 B2 | 2/2012 | Kondo |
| 8,125,370 B1 | 2/2012 | Rogers et al. |
| 8,125,546 B2 | 2/2012 | Adams, Jr. et al. |
| 8,134,490 B2 | 3/2012 | Gebert et al. |
| 8,138,961 B2 | 3/2012 | Deshpande |
| 8,169,358 B1 | 5/2012 | Bourdelais et al. |
| 8,169,362 B2 | 5/2012 | Cook et al. |
| 8,179,445 B2 | 5/2012 | Hao |
| 8,180,851 B1 | 5/2012 | Cavelie |
| 8,194,296 B2 | 6/2012 | Compton et al. |
| 8,203,615 B2 | 6/2012 | Wang et al. |
| 8,203,633 B2 | 6/2012 | Adams, Jr. et al. |
| 8,204,966 B1 | 6/2012 | Mendis et al. |
| 8,212,711 B1 | 7/2012 | Schultz et al. |
| 8,274,422 B1 | 9/2012 | Smith et al. |
| 8,299,959 B2 | 10/2012 | Vossiek et al. |
| 8,358,359 B2 | 1/2013 | Baker et al. |
| 8,362,944 B2 | 1/2013 | Lancashire |
| 8,384,583 B2 | 2/2013 | Leva et al. |
| 8,411,146 B2 | 4/2013 | Twede |
| 8,441,393 B2 | 5/2013 | Strauch et al. |
| 8,482,452 B2 | 7/2013 | Chambers et al. |
| 8,487,996 B2 | 7/2013 | Mann et al. |
| 8,493,262 B2 | 7/2013 | Boufounos et al. |

(56) References Cited

U.S. PATENT DOCUMENTS

| | | |
|---|---|---|
| 8,493,264 B2 | 7/2013 | Sasakawa |
| 8,502,730 B2 | 8/2013 | Roche |
| 8,532,958 B2 | 9/2013 | Ingram et al. |
| 8,543,255 B2 | 9/2013 | Wood et al. |
| 8,558,735 B2 | 10/2013 | Bachmann et al. |
| 8,576,111 B2 | 11/2013 | Smith et al. |
| 8,594,375 B1 | 11/2013 | Padwick |
| 8,610,771 B2 | 12/2013 | Leung et al. |
| 8,698,668 B2 | 4/2014 | Hellsten |
| 8,711,029 B2 | 4/2014 | Ferretti et al. |
| 8,723,721 B2 | 5/2014 | Moruzzis et al. |
| 8,724,918 B2 | 5/2014 | Abraham |
| 8,760,634 B2 | 6/2014 | Rose |
| 8,768,104 B2 | 7/2014 | Moses et al. |
| 8,803,732 B2 | 8/2014 | Antonik et al. |
| 8,823,813 B2 | 9/2014 | Mantzel et al. |
| 8,824,544 B2 | 9/2014 | Nguyen et al. |
| 8,836,573 B2 | 9/2014 | Yanagihara et al. |
| 8,854,253 B2 | 10/2014 | Edvardsson |
| 8,854,255 B1 | 10/2014 | Ehret |
| 8,860,824 B2 | 10/2014 | Jelinek |
| 8,861,588 B2 | 10/2014 | Nguyen et al. |
| 8,879,793 B2 | 11/2014 | Peterson |
| 8,879,865 B2 | 11/2014 | Li et al. |
| 8,879,996 B2 | 11/2014 | Kenney |
| 8,891,066 B2 | 11/2014 | Bamler et al. |
| 8,903,134 B2 | 12/2014 | Abileah |
| 8,912,950 B2 | 12/2014 | Adcook |
| 8,957,806 B2 | 2/2015 | Schaefer |
| 8,977,062 B2 | 3/2015 | Gonzalez et al. |
| 8,988,273 B2 | 3/2015 | Marianer et al. |
| 9,013,348 B2 | 4/2015 | Riedel et al. |
| 9,019,143 B2 | 4/2015 | Obermeyer |
| 9,019,144 B2 | 4/2015 | Calabrese |
| 9,037,414 B1 | 5/2015 | Pratt |
| 9,063,544 B2 | 6/2015 | Vian et al. |
| 9,071,337 B2 | 6/2015 | Hellsten |
| 9,106,857 B1 | 8/2015 | Faramarzpour |
| 9,126,700 B2 | 9/2015 | Ozkul et al. |
| 9,134,414 B2 | 9/2015 | Bergeron |
| 9,148,601 B2 | 9/2015 | Fox |
| 9,176,227 B2 | 11/2015 | Bergeron et al. |
| 9,182,483 B2 | 11/2015 | Liu et al. |
| 9,210,403 B2 | 12/2015 | Martinerie et al. |
| 9,244,155 B1 | 1/2016 | Bielas |
| 9,261,592 B2 | 2/2016 | Boufounos et al. |
| 9,291,711 B2 | 3/2016 | Healy, Jr. et al. |
| 9,329,263 B2 | 5/2016 | Haynes et al. |
| 9,389,311 B1 | 7/2016 | Moya et al. |
| 9,395,437 B2 | 7/2016 | Ton et al. |
| 9,400,329 B2 | 7/2016 | Pillay |
| 9,411,039 B2 | 8/2016 | Dehlink et al. |
| 9,417,323 B2 | 8/2016 | Carande et al. |
| 9,426,397 B2 | 8/2016 | Wein |
| 9,529,081 B2 | 12/2016 | Whelan et al. |
| 9,531,081 B2 | 12/2016 | Huber et al. |
| 9,684,071 B2 | 6/2017 | Wishart |
| 9,684,673 B2 | 6/2017 | Beckett et al. |
| 10,230,925 B2 | 3/2019 | Maciejewski et al. |
| 2001/0013566 A1 | 8/2001 | Yung et al. |
| 2002/0003502 A1 | 1/2002 | Falk |
| 2002/0147544 A1 | 10/2002 | Nicosia et al. |
| 2002/0196178 A1 | 12/2002 | Beard |
| 2003/0006364 A1 | 1/2003 | Katzir et al. |
| 2004/0021600 A1 | 2/2004 | Wittenberg |
| 2004/0104859 A1 | 6/2004 | Lo |
| 2004/0150547 A1 | 8/2004 | Suess et al. |
| 2004/0227659 A1 | 11/2004 | Woodford et al. |
| 2005/0212692 A1 | 9/2005 | Iny et al. |
| 2005/0270299 A1 | 12/2005 | Rasmussen et al. |
| 2005/0288859 A1 | 12/2005 | Golding et al. |
| 2006/0132753 A1 | 6/2006 | Nichols et al. |
| 2006/0273946 A1 | 12/2006 | Krikorian et al. |
| 2007/0024879 A1 | 2/2007 | Hamilton, Jr. et al. |
| 2007/0051890 A1 | 3/2007 | Pittman |
| 2007/0080830 A1 | 4/2007 | Sacks |
| 2007/0102629 A1 | 5/2007 | Richard et al. |
| 2007/0120979 A1 | 5/2007 | Zhang et al. |
| 2007/0146195 A1 | 6/2007 | Wallenberg et al. |
| 2007/0168370 A1 | 7/2007 | Hardy |
| 2007/0192391 A1 | 8/2007 | McEwan |
| 2007/0279284 A1 | 12/2007 | Karayil Thekkoott Narayanan |
| 2008/0074338 A1 | 3/2008 | Vacanti |
| 2008/0081556 A1 | 4/2008 | Robinson |
| 2008/0111731 A1* | 5/2008 | Hubbard ............. G01S 13/872 342/160 |
| 2008/0123997 A1 | 5/2008 | Adams et al. |
| 2008/0240602 A1 | 10/2008 | Adams et al. |
| 2009/0009391 A1 | 1/2009 | Fox et al. |
| 2009/0011777 A1 | 1/2009 | Grunebach et al. |
| 2009/0021588 A1 | 1/2009 | Border et al. |
| 2009/0046182 A1 | 2/2009 | Adams, Jr. et al. |
| 2009/0046995 A1 | 2/2009 | Kanumuri et al. |
| 2009/0051585 A1 | 2/2009 | Krikorian et al. |
| 2009/0087087 A1 | 4/2009 | Palum et al. |
| 2009/0109086 A1 | 4/2009 | Krieger et al. |
| 2009/0147112 A1 | 6/2009 | Baldwin |
| 2009/0179790 A1* | 7/2009 | Jahangir ............. G01S 13/9029 342/25 B |
| 2009/0226114 A1 | 9/2009 | Choi et al. |
| 2009/0256909 A1 | 10/2009 | Nixon |
| 2009/0289838 A1 | 11/2009 | Braun |
| 2010/0039313 A1 | 2/2010 | Morris |
| 2010/0045513 A1 | 2/2010 | Pett et al. |
| 2010/0063733 A1 | 3/2010 | Yunck |
| 2010/0128137 A1 | 5/2010 | Guidash |
| 2010/0149396 A1 | 6/2010 | Summa et al. |
| 2010/0194901 A1 | 8/2010 | van Hoorebeke et al. |
| 2010/0232692 A1 | 9/2010 | Kumar et al. |
| 2010/0302418 A1 | 12/2010 | Adams, Jr. et al. |
| 2010/0309347 A1 | 12/2010 | Adams, Jr. et al. |
| 2010/0321234 A1* | 12/2010 | Goldman ............. G01S 13/9054 342/25 A |
| 2010/0321235 A1 | 12/2010 | Vossiek et al. |
| 2010/0328499 A1 | 12/2010 | Sun |
| 2011/0052095 A1 | 3/2011 | Deever |
| 2011/0055290 A1 | 3/2011 | Li et al. |
| 2011/0098986 A1 | 4/2011 | Fernandes Rodrigues et al. |
| 2011/0115793 A1 | 5/2011 | Grycewicz |
| 2011/0115954 A1 | 5/2011 | Compton |
| 2011/0134224 A1 | 6/2011 | McClatchie |
| 2011/0156878 A1 | 6/2011 | Wu et al. |
| 2011/0175771 A1 | 7/2011 | Raney |
| 2011/0187902 A1 | 8/2011 | Adams, Jr. et al. |
| 2011/0199492 A1 | 8/2011 | Kauker et al. |
| 2011/0279702 A1 | 11/2011 | Plowman et al. |
| 2011/0282871 A1 | 11/2011 | Seefeld et al. |
| 2012/0019660 A1 | 1/2012 | Golan et al. |
| 2012/0044328 A1 | 2/2012 | Gere |
| 2012/0068880 A1 | 3/2012 | Kullstam et al. |
| 2012/0076229 A1 | 3/2012 | Brobston et al. |
| 2012/0105276 A1 | 5/2012 | Ryland |
| 2012/0127028 A1 | 5/2012 | Bamler et al. |
| 2012/0127331 A1 | 5/2012 | Grycewicz |
| 2012/0133550 A1 | 5/2012 | Benninghofen et al. |
| 2012/0146869 A1 | 6/2012 | Holland et al. |
| 2012/0154584 A1 | 6/2012 | Omer et al. |
| 2012/0200703 A1 | 8/2012 | Nadir et al. |
| 2012/0201427 A1 | 8/2012 | Jasinski et al. |
| 2012/0257047 A1 | 10/2012 | Biesemans et al. |
| 2012/0271609 A1 | 10/2012 | Laake et al. |
| 2012/0274505 A1 | 11/2012 | Pritt et al. |
| 2012/0293669 A1 | 11/2012 | Mann et al. |
| 2012/0323992 A1 | 12/2012 | Brobst et al. |
| 2013/0021475 A1 | 1/2013 | Canant et al. |
| 2013/0050488 A1 | 2/2013 | Brouard et al. |
| 2013/0063489 A1 | 3/2013 | Hourie et al. |
| 2013/0080594 A1 | 3/2013 | Nourse et al. |
| 2013/0120205 A1 | 5/2013 | Thompson et al. |
| 2013/0201050 A1 | 8/2013 | Hellsten |
| 2013/0234879 A1 | 9/2013 | Wilson-Langman et al. |
| 2013/0257641 A1 | 10/2013 | Ronning |
| 2013/0321228 A1 | 12/2013 | Crockett, Jr. et al. |
| 2013/0321229 A1 | 12/2013 | Klefenz et al. |

(56) References Cited

U.S. PATENT DOCUMENTS

| | | |
|---|---|---|
| 2013/0335256 A1 | 12/2013 | Smith et al. |
| 2014/0027576 A1 | 1/2014 | Boshuizen et al. |
| 2014/0062764 A1 | 3/2014 | Reis et al. |
| 2014/0068439 A1 | 3/2014 | Lacaze et al. |
| 2014/0078153 A1 | 3/2014 | Richardson |
| 2014/0149372 A1 | 5/2014 | Sankar et al. |
| 2014/0191894 A1 | 7/2014 | Chen et al. |
| 2014/0232591 A1 | 8/2014 | Liu et al. |
| 2014/0266868 A1* | 9/2014 | Schuman .............. G01S 13/325 342/25 B |
| 2014/0282035 A1 | 9/2014 | Murthy et al. |
| 2014/0307950 A1 | 10/2014 | Jancsary et al. |
| 2014/0313071 A1 | 10/2014 | McCorkle |
| 2014/0344296 A1 | 11/2014 | Chawathe et al. |
| 2014/0361921 A1* | 12/2014 | Aprile ................ G01S 13/9029 342/25 B |
| 2015/0015692 A1 | 1/2015 | Smart |
| 2015/0054678 A1 | 2/2015 | Wakayama |
| 2015/0080725 A1 | 3/2015 | Wegner |
| 2015/0145716 A1 | 5/2015 | Woodsum |
| 2015/0160337 A1 | 6/2015 | Muff |
| 2015/0168554 A1 | 6/2015 | Aharoni et al. |
| 2015/0247923 A1 | 9/2015 | LaBarca et al. |
| 2015/0253423 A1 | 9/2015 | Liu et al. |
| 2015/0280326 A1 | 10/2015 | Arii |
| 2015/0323659 A1 | 11/2015 | Mitchell |
| 2015/0323665 A1 | 11/2015 | Murata |
| 2015/0323666 A1 | 11/2015 | Murata |
| 2015/0324989 A1 | 11/2015 | Smith et al. |
| 2015/0331097 A1 | 11/2015 | Hellsten |
| 2015/0346336 A1 | 12/2015 | Di Giorgio et al. |
| 2015/0369913 A1 | 12/2015 | Jung et al. |
| 2015/0371431 A1 | 12/2015 | Korb et al. |
| 2015/0378004 A1 | 12/2015 | Wilson-Langman et al. |
| 2015/0378018 A1 | 12/2015 | Calabrese |
| 2015/0379957 A1 | 12/2015 | Roegelein et al. |
| 2016/0012367 A1 | 1/2016 | Korb et al. |
| 2016/0019458 A1 | 1/2016 | Kaufhold |
| 2016/0020848 A1 | 1/2016 | Leonard |
| 2016/0033639 A1 | 2/2016 | Jung et al. |
| 2016/0109570 A1 | 4/2016 | Calabrese |
| 2016/0139259 A1 | 5/2016 | Rappaport et al. |
| 2016/0139261 A1 | 5/2016 | Becker |
| 2016/0170018 A1 | 6/2016 | Yamaoka |
| 2016/0202347 A1 | 7/2016 | Malinovskiy et al. |
| 2016/0204514 A1 | 7/2016 | Miraftab et al. |
| 2016/0216372 A1 | 7/2016 | Liu et al. |
| 2016/0223642 A1 | 8/2016 | Moore et al. |
| 2016/0238696 A1 | 8/2016 | Hintz |
| 2016/0282463 A1 | 9/2016 | Guy et al. |
| 2016/0300375 A1 | 10/2016 | Beckett et al. |
| 2016/0306824 A1 | 10/2016 | Lopez et al. |
| 2017/0160381 A1 | 6/2017 | Cho et al. |
| 2017/0170567 A1 | 6/2017 | Bing et al. |
| 2017/0214889 A1 | 7/2017 | Maciejewski et al. |
| 2018/0100920 A1* | 4/2018 | Thomas, Jr. ........ G01S 13/9023 |
| 2018/0172823 A1 | 6/2018 | Tyc |
| 2018/0172824 A1 | 6/2018 | Beckett et al. |
| 2018/0259639 A1 | 9/2018 | Rubel et al. |
| 2018/0322784 A1 | 11/2018 | Schild |
| 2018/0335518 A1 | 11/2018 | Fox |
| 2018/0356516 A1 | 12/2018 | Fox |
| 2018/0366837 A1 | 12/2018 | Fox et al. |

FOREIGN PATENT DOCUMENTS

| | | |
|---|---|---|
| CA | 2553008 C | 1/2007 |
| CA | 2827279 A1 | 4/2014 |
| CN | 101907704 A | 12/2010 |
| CN | 102394379 A | 3/2012 |
| CN | 102983410 | 3/2013 |
| CN | 103414027 | 11/2013 |
| CN | 103679714 A | 3/2014 |
| CN | 104201469 A | 12/2014 |
| DE | 102007039095 | 2/2009 |
| DE | 202009003286 U1 | 5/2009 |
| EP | 0 924 534 A2 | 6/1999 |
| EP | 0 846 960 B1 | 3/2004 |
| EP | 1 504 287 | 2/2005 |
| EP | 1698856 A2 | 9/2006 |
| EP | 1509784 B1 | 2/2008 |
| EP | 1746437 B1 | 9/2008 |
| EP | 1966630 B1 | 9/2008 |
| EP | 2 230 533 A1 | 9/2010 |
| EP | 2 242 252 A2 | 10/2010 |
| EP | 2392943 B1 | 7/2011 |
| EP | 2416174 A1 | 8/2012 |
| EP | 2560144 A2 | 2/2013 |
| EP | 2610636 A1 | 7/2013 |
| EP | 2762916 A2 | 8/2014 |
| EP | 2778635 A1 | 9/2014 |
| EP | 2 828 685 | 1/2015 |
| EP | 2 875 384 | 5/2015 |
| EP | 2662704 B1 | 1/2016 |
| EP | 2743727 B1 | 1/2016 |
| EP | 2759847 B1 | 1/2016 |
| EP | 2762917 B1 | 1/2016 |
| EP | 2767849 B1 | 1/2016 |
| EP | 2896971 B1 | 3/2016 |
| EP | 3012658 A1 | 4/2016 |
| EP | 3032648 A1 | 6/2016 |
| EP | 3 060 939 | 8/2016 |
| EP | 3056922 A2 | 8/2016 |
| EP | 2 784 537 B1 | 10/2016 |
| EP | 3 077 985 | 10/2016 |
| EP | 3 077 986 | 10/2016 |
| EP | 3 214 460 A1 | 9/2017 |
| JP | S56108976 A | 8/1981 |
| JP | 60-257380 A | 12/1985 |
| JP | 2001-122199 A | 5/2001 |
| KR | 10-2010-0035056 A | 4/2010 |
| KR | 10-2012-0000842 A | 1/2012 |
| KR | 101461129 B1 | 11/2014 |
| KR | 10-2016-0002694 A | 1/2016 |
| RU | 2349513 C2 | 3/2009 |
| WO | 00055602 A1 | 9/2000 |
| WO | 02/18874 A1 | 3/2002 |
| WO | 02056053 A3 | 7/2002 |
| WO | 03005059 A1 | 1/2003 |
| WO | 03/040653 A1 | 5/2003 |
| WO | 03005080 A2 | 7/2003 |
| WO | 03/096064 A1 | 11/2003 |
| WO | 2007076824 A2 | 7/2007 |
| WO | 2009025825 A1 | 2/2009 |
| WO | 2009030339 A1 | 3/2009 |
| WO | 2009085305 A1 | 7/2009 |
| WO | 2010052530 A1 | 5/2010 |
| WO | 2010/122327 A1 | 10/2010 |
| WO | 2011/138744 A2 | 11/2011 |
| WO | 2011/154804 A1 | 12/2011 |
| WO | 2012120137 A1 | 9/2012 |
| WO | 2012143756 A1 | 10/2012 |
| WO | 2012148919 A2 | 11/2012 |
| WO | 2013/112955 A1 | 8/2013 |
| WO | 2013162657 A1 | 10/2013 |
| WO | 2014/012828 A1 | 1/2014 |
| WO | 2014/089318 A1 | 6/2014 |
| WO | 2014097263 A1 | 6/2014 |
| WO | 2015059043 A1 | 4/2015 |
| WO | 2015/112263 A2 | 7/2015 |
| WO | 2015/130365 A2 | 9/2015 |
| WO | 2015/192056 A1 | 12/2015 |
| WO | 2016/022637 A1 | 2/2016 |
| WO | 2016132106 A1 | 8/2016 |
| WO | 2016/202662 A1 | 12/2016 |
| WO | 2016/205406 A1 | 12/2016 |
| WO | 2017/044168 A2 | 3/2017 |
| WO | 2017/048339 A1 | 3/2017 |

(56) References Cited

FOREIGN PATENT DOCUMENTS

| WO | 2017/091747 A1 | 6/2017 |
|---|---|---|
| WO | 2017/094157 A1 | 6/2017 |

OTHER PUBLICATIONS

U.S. office action from related case U.S. Appl. No. 15/561,437 dated Jan. 27, 2020.
International Preliminary Report on Patentability from related matter PCT/US2018/034144 dated Nov. 26, 2019.
International Preliminary Report on Patentability from related matter PCT/US18/34146 dated Nov. 26, 2019.
Extended European Search Report from related application 18806689.8 dated Oct. 1, 2020.
Extended European Search Report from related application 18806829.8 dated Sep. 28, 2020.
Mettermayer et al., "Conceptual Studies for exploiting the TerraSAR-X dual receive antennea", IEEE International Geoscience and Remote Sensing Sym., Jul. 21, 2003.
Grafmulleret al, "The TerraSAR-X Antenna System", IEEE International Radar Conference Record, May 12, 2005.
Gebele, et al., Comparison of Techniques for Future Spaceborne GMTI, 8th European Conference on Synthetic Aperture Radar, Jun. 10, 2020.
Mittermayer et al., Approach to Velocity and Acceleration Measurement in the Bi-Directional SAR Imaging Mode, IEEE Jul. 22, 2012.
Mittermayer et al., "Bidirectional SAR Imaging Mode", IEEE Transactions on Geoscience and Remote Sensing, Jan. 1, 2013.
International Preliminary Report on Patentability issued in PCT Application No. PCT/US2016/037666, dated Dec. 28, 2017, 7 pages.
International Preliminary Report on Patentability issued in PCT Application No. PCT/US2016/037675, dated Dec. 28, 2017, 9 pages.
International Search Report and Written Opinion issued in PCT Application No. PCT/US2016/037681, dated Sep. 23, 2016, 10 pages.
Supplementary Partial Search Report issued in European Application No. 16846990.6, dated May 18, 2018, 16 pages.
Extended European Search Report issued in European Application No. 16844829.8, dated Apr. 25, 2018, 9 pages.
Extended European Search Report issued in European Application No. 16812363.6, dated May 14, 2018, 8 pages.
Larson & J R Wertz (EDS): "Orbit Maintenance," Space Mission Analysis and Design, Jan. 1, 1997, pp. 153-154, 177 (XP002214373), 15 pages.
"Envi Tutorials," Sep. 1, 2000, URL:http://heim.ifi.uio.no/"infl60/tutorial.pdf (XP055472060), 590 pages.
Partial Supplementary Search Report issued in European Application No. 15829734.1, dated Dec. 21, 2017, 16 pages.
Extended European Search Report issued in European Application No. 16846990.6, dated Aug. 16, 2018, 16 pages.
Caltagirone et al., "The COSMO-SkyMed Dual Use Earth Observation Program: Development, Qualification, and Results of the Commissioning of the Overall Constellation", IEEE Journal of Selected Topics in Applied Earth Observations and Remote Sensing, IEEE, USA, vol. 7, No. 7, Jul. 1, 2014, (XP011557179), 9 pages.
Preliminary Amendment filed in Application No. PCT/US2015/043739, dated Feb. 7, 2017, 12 pages.
International Search Report and Written Opinion issued in PCT Application No. PCT/US2015/043739, dated Nov. 11,2015, 12 pages.
Preliminary Amendment filed in U.S. Appl. No. 15/561,437, dated Sep. 25, 2017, 11 pages.
International Search Report and Written Opinion issued in PCT Application No. PCT/US2016/022841, dated Jun. 3, 2016, 10 pages.
Preliminary Amendment filed in U.S. Appl. No. 15/737,065, dated Dec. 15, 2017, 8 pages.
International Search Report and Written Opinion issued in PCT Application No. PCT/US2016/037666, dated Mar. 27, 2017, 8 pages.
Preliminary Amendment filed in U.S. Appl. No. 15/737,016, dated Dec. 15, 2017, 8 pages.
International Search Report and Written Opinion issued in PCT Application No. PCT/US2016/037675, dated Feb. 16, 10 pages.
International Search Report and Written Opinion issued in PCT Application No. PCT/US2016/063630, dated Feb. 13, 2017, 8 pages.
Analog Devices, MT-085 Tutorial, "Fundamentals of Direct Digital Synthesis (DDS)", 2008, pp. 1-9.
Bordoni, Federica, et al.: "Calibration Error Model for Multichannel Spaceborne SAR Systems Based on Digital Beamforming", Proceedings of the 10th European Radar Conference, Oct. 9-11, 2013, pp. 184-187.
D'Aria, D., et al.: "A Wide Swath, Full Polarimetric, L band spaceborne SAR", IEEE, 2008, 4 pages.
El Sanhoury, Ahmed, et al.: "Performance Improvement of Pulsed OFDM UWB Systems Using ATF coding", ICCCE, May 11-13, 2010, IEEE, 4 pages.
Freeman: IEEE Transactions on Geoscience and Remote Sensing, vol. 38, No. 1, Jan. 1, 2000, pp. 320-324.
Freeman, Anthony, et al.: On the Detection of Faraday Rotation in Linearly Polarized L-Band SAR Backscatter Signatures, IEEE Transactions on Geoscience and Remote Sensing, vol. 42, No. 8, Aug. 2004, pp. 1607-1616.
Giuli, D., et al.: "Radar target scattering matrix measurement through orthogonal signals" IEE Proceedings-F, vol. 140, No. 4, Part F, Aug. 1993, pp. 233-242.
Hossain, Md Anowar, et al.: "Multi-Frequency Image Fusion Based on MIMO UWB OFDM Synthetic Aperture Radar", New Advances in Image Fusion, INTECH Open Science/Open Minds, 2013, 21 pages.
Kankaku, Y., et al.: "The Overview of the L-band SAR Onboard ALOS-2", Progress in Electromagnetics Research Symposium Proceedings, Moscow, Russia, Aug. 18-21, 2009, pp. 735-738.
Lombardo, P., et al.: "Monitoring and surveillance potentialities obtained by splitting the antenna of the COSMO-SkyMed SAR into multiple sub-apertures", The Institution of Engineering and Technology, IEE Proceedings, Apr. 2006, pp. 104-116.
Meyer, Franz J., et al.: "Prediction, Detection, and Correction of Faraday Rotation in Full-Polarimetric L-Band SAR Data", IEEE Transactions on Geoscience and Remote Sensing, vol. 46, No. 10, Oct. 2008, pp. 3076-3086.
Raney, Keith R.: "Hybrid-Polarity SAR Architecture", IEEE Transactions on Geoscience and Remote Sensing, vol. 45, No. 11, Nov. 2007, pp. 3397-3404.
Rouse, Shane, et al.: "Swathbuckler Wide Area SAR Processing Front End", IEEE 2006, pp. 673-678.
Rudolf, Hans: "Increase of Information by Polarimetric Radar Systems", Doctoral Dissertation, 2000, 5 pages.
Sakiotis, N.G., et al.: Proceedings of the I.R.E., 1953, pp. 87-93.
Souissi, B., et al.: "Investigation of the capabaility of the Compact Polarimetry mode to Reconstruct Full Polarimetry mode using RADARSAT2 data", Advanced Electromagnetics, vol. 1, No. 1, May 2012, 10 pages.
Space Dynamics Laboratory, "RASAR", 2013, 2 pages.
Van Zyl, Jakob, et al.: "Synthetic Aperture Radar Polarimetry", JPL Space Science and Technology Series, 2010, 333 pages.
Werninghaus, Rolf, et al.: "The TerraSAR-X Mission", 2004, 4 pages.
Wolff: "Radar Basics-Exciter", Radartutorial.eu, http://www.radartutorial.eu/08.transmitters/Exciter.en.html, downloaded Mar. 6, 2018, 2 pages.
Wright, P.A., et al.: "Faraday Rotation Effects on L-Band Spaceborne SAR Data", IEEE Transactions on Geoscience and Remote Sensing, vol. 41, No. 12, Dec. 2003, pp. 2735-2744.
Zhang, T., et al.: "OFDM Synthetic Aperture Radar Imaging With Sufficient Cyclic Prefix", IEEE Transactions on Geoscience and Remote Sensing, vol. 53, No. 1, Jan. 2015, pp. 394-404.

(56) References Cited

OTHER PUBLICATIONS

European Communication issued in European Application No. 14883549.9, dated Nov. 24, 2017, 8 pages.
European Office Action from related application EP16846990.6 dated Jun. 4, 2020.
Notice of Allowance, dated Sep. 18, 2019, for U.S. Appl. No. 15/737,065, Peter Allen Fox et al., "Efficient Planar Phased Array Antenna Assembly", 9 pages.
Office Action, dated Oct. 4, 2019, for U.S. Appl. No. 15/737,044, Keith Dennis Richard Beckett et al., "System and Methods for Enhancing Synthetic Aperture Radar Imagery", 9 pages.
Office Action, dated Oct. 18, 2019, for U.S. Appl. No. 15/737,016, George Tyc., "Systems and Methods for Remote Sensing of the Earth from Space", 18 pages.
Foody, Gile M., "Status of Land Cover Classification Accuracy Assessment", University of Southampton, Jul. 21, 2001, 17 pages.
European Examination Report from related application 16812363.6, dated Feb. 6, 2020.
International Search Report and Written Opinion issued in PCT Application No. PCT/US2018/034144, dated Sep. 13, 2018, 15 pages.
International Preliminary Report on Patentability issued in PCT Application No. PCT/US2016/037681, dated Dec. 28, 2017, 7 pages.
International Preliminary Report on Patentability issued in PCT Application No. PCT/US2016/022841, dated Oct. 5, 2017, 8 pages.
Kraus et al., "TerraSAR-X Staring Spotlight Mode Optimization and Global Performance Predictions" in IEEE Journal of Selected Topics in Application Earth Observations and Remote Sensing, vol. 9, No. 3, Mar. 2016, pp. 1015-1027.
Office Action, for U.S. Appl. No. 16/616,362, dated Sep. 20, 2021, 34 pages.
"ISR Systems and Technology," Lincoln Laboratory, Massachusetts Institute of Technology, archived Jan. 19, 2017. URL=https://www.ll.mit.edu/mission/isr/israccomplishments.html, download date Oct. 8, 2018, 2 pages.
"Northrop's SABR radar completes auto target cueing capability demonstration," May 20, 2013, URL=https://www.airforce-technology.com/news/newsnorthrops-sabr-radar-completes-auto-target-cueing-capability-demonstration/, download date Oct. 8, 2018, 3 pages.
Amendment, filed Jan. 17, 2019, for U.S. Appl. No. 15/101,336, Lopez et al., "Systems and Methods for Earth Observation," 25 pages.
Amendment, filed Sep. 5, 2018, for U.S. Appl. No. 15/316,469. Maciejewski et al., "Systems and Methods for Processing and Providing Terrestrial and/or Space-Based Earth Observation Video," 9 pages.
Beckett et al., "Systems and Methods for Enhancing Synthetic Aperture Radar Imagery," U.S. Appl. No. 62/180,449, filed Jun. 16, 2015, 34 pages.
Beckett, "UrtheCast Second-Generation Earth Observation Sensors," $36^{th}$ International Symposium on Remote Sensing of Environment, Berlin, Germany, May 11-15, 2015, pp. 1069-1073.
Bickel et al., "Effects of Magneto-Ionic Propagation on the Polarization Scattering Matrix," Proceedings of the IEEE 53(8): 1089-1091, 1965.
Bidigare, "MIMO Capacity of Radar as a Communications Channel," Adaptive Sensor and Array Processing Workshop, Lexington, Massachusetts, USA, Mar. 11-13, 2003, 19 pages.
Boccia, "Bathymetric Digital Elevation Model Generation from L-band and X-band Synthetic Aperture Radar Images in the Gulf of Naples, Italy: Innovative Techniques and Experimental Results," doctoral thesis, University of Naples Federico II, Naples, Italy, 2015, 161 pages.
Bordoni et al., "Ambiguity Suppression by Azimuth Phase Coding in Multichannel SAR Systems," International Geoscience and Remote Sensing Symposium, Vancouver, Canada, Jul. 24-29, 2011, 16 pages.
Brysk, "Measurement of the Scattering Matrix with an Intervening Ionosphere," Transactions of the American Institute of Electrical Engineers 77(5):611-612, 1958.
Di Iorio et al., "Innovation Technologies and Applications for Coastal Archaeological sites FP7—ITACA," $36^{th}$ International Symposium on Remote Sensing of Environment, Berlin, Germany, May 11-15, 2015, pp. 1367-1373.
Evans, "Venus, Unmasked: 25 Years Since the Arrival of Magellan at Earth's Evil Twin," Aug. 10, 2015, URL=http://www.americaspace.com/2015/08/10/venus-unmasked-25-years-since-the-arrival-of-magellan-at-earths-evil-twin/, download date Oct. 8, 2018, 4 pages.
Extended European Search Report, dated Mar. 27, 2018, for European Application No. 15829734.1-1206, 18 pages.
Extended European Search Report, dated Oct. 24, 2016, for European Application No. 14880012.1-1951, 10 pages.
Extended European Search Report, dated Oct. 24, 2016, for European Application No. 14883549.9-1951, 10 pages.
Fard et al., "Classifier Fusion of High-Resolution Optical and Synthetic Aperture Radar (SAR) Satellite Imagery for Classification in Urban Area," $1^{st}$ International Conference on Geospatial Information Research, Tehran, Iran, Nov. 15-17, 2014, 5 pages.
Forkuor et al., "Integration of Optical and Synthetic Aperture Radar Imagery for Improving Crop Mapping in Northwestern Benin, West Africa," Remote Sensing 6(7):6472-6499, 2014.
Fox et al., "Apparatus and Methods for a Synthetic Aperture Radar With Multi-Aperture Antenna," U.S. Appl. No. 62/510,182, filed May 23, 2017, 42 pages.
Fox et al., "Apparatus and Methods for a Synthetic Aperture Radar with Self-Cueing," U.S. Appl. No. 62/510,132, filed May 23, 2017, 39 pages.
Fox et al., "Range Ambiguity Suppression in Digital Multibeam," U.S. Appl. No. 62/590,153, filed Nov. 22, 2017, 19 pages.
Fox et al., "Synthetic Aperture Radar Imaging Apparatus and Methods for Moving Targets," U.S. Appl. No. 62/510,191, filed May 23, 2017, 24 pages.
Fox, "Apparatus and Methods for Quad-Polarized Synthetic Aperture Radar," U.S. Appl. No. 62/035,279, filed Aug. 8, 2014, 52 pages.
Fox, "Efficient Planar Phased Array Antenna Assembly," U.S. Appl. No. 62/180,421, filed Jun. 16, 2015, 33 pages.
Fox, "Synthetic Aperture Radar Imaging Apparatus and Methods," U.S. Appl. No. 62/260,063, filed Nov. 25, 2015, 41 pages.
Fox, "Synthetic Aperture Radar Imaging Apparatus and Methods," U.S. Appl. No. 62/510,123, filed May 23, 2017, 74 pages.
Hadjis, "Automatic Modulation Classification of Common Communication and Pulse Compression Radar Waveforms Using Cyclic Features," master's thesis, Air Force Institute of Technology, Wright-Patterson Air Force Base, Ohio, USA, Mar. 2013, 96 pages.
Heege et al., "Mapping of water depth, turbidity and sea state properties using multiple satellite sensors in aquatic systems," Hydro 2010, Rostock, Germany, Nov. 2-5, 2010, 27 pages.
Hoogeboom et al., "Integrated Observation Networks of the Future," $4^{th}$ Forum on Global Monitoring for Environment and Security, Baveno, Italy, Nov. 26-28, 2003, 14 pages.
Hounam et al., "A Technique for the Identification and Localization of SAR Targets Using Encoding Transponders," IEEE Transactions on Geoscience and Remote Sensing 39(1):3-7, 2001.
Huang et al., "Analog Beamforming and Digital Beamforming on Receive for Range Ambiguity Suppression in Spaceborne SAR," International Journal of Antennas and Propagation 2015:182080, 2015. (7 pages).
Huang et al., "ASTC-MIMO-TOPS Mode with Digital Beam-Forming in Elevation for High-Resolution Wide-Swath Imaging," Remote Sensing 7(3):2952-2970, 2015.
International Preliminary Report on Patentability, dated Dec. 15, 2016, for International Application No. PCT/US2015/035628, 8 pages.
International Preliminary Report on Patentability, dated Feb. 14, 2017, for International Application No. PCT/US2015/043739, 10 pages.
International Preliminary Report on Patentability, dated Jun. 7, 2016, for International Application No. PCT/US2014/068642, 10 pages.

(56) References Cited

OTHER PUBLICATIONS

International Preliminary Report on Patentability, dated Jun. 7, 2016, for International Application No. PCT/US2014/068645, 14 pages.
International Preliminary Report on Patentability, dated May 29, 2018, for International Application No. PCT/US2016/063630, 6 pages.
International Search Report and Written Opinion, dated Aug. 27. 2015, for International Application No. PCT/US2014/068642, 13 pages.
International Search Report and Written Opinion, dated Sep. 13, 2018, for International Application No. PCT/US2018/033970, 15 pages.
International Search Report and Written Opinion, dated Sep. 13, 2018, for International Application No. PCT/US2018/033971, 13 pages.
International Search Report and Written Opinion, dated Sep. 13, 2018, for International Application No. PCT/US2018/034144, 11 pages.
International Search Report and Written Opinion, dated Sep. 13, 2018, for International Application No. PCT/US2018/034146, 8 pages.
International Search Report and Written Opinion, dated Sep. 2, 2015, for International Application No. PCT/US2014/068645, 16 pages.
International Search Report and Written Opinion, dated Sep. 21, 2015, for International Application No. PCT/US2015/035628, 10 pages.
Kimura, "Calibration of Polarimetric PALSAR Imagery Affected by Faraday Rotation Using Polarization Orientation," IEEE Transactions on Geoscience and Remote Sensing 47(12):3943-3950, 2009.
Krieger et al., "CEBRAS: Cross Elevation Beam Range Ambiguity Suppression for High-Resolution Wide-Swath and MIMO-SAR Imaging," International Geoscience and Remote Sensing Symposium, Milan, Italy, Jul. 26-31, 2015, pp. 196-199.
Krieger et al., "Multidimensional Waveform Encoding: A New Digital Beamforming Technique for Synthetic Aperture Radar Remote Sensing," IEEE Transactions on Geoscience and Remote Sensing 46(1):31-46, 2008.
Linne von Berg, "Autonomous Networked Multi-Sensor Imaging Systems," Imaging Systems and Applications, Monterey, California, USA, Jun. 24-28, 2012, 2 pages.
Linne von Berg, "Multi-Sensor Airborne Imagery Collection and Processing Onboard Small Unmanned Systems," Proceedings of SPIE 7668(1):766807, 2010. (11 pages).
Livingstone et al., "RADARSAT-2 System and Mode Description," Systems Concepts and Integration Symposium, Colorado Springs, Colorado, USA, Oct. 10-12, 2005, 22 pages.
Lopez et al., "Systems and Methods for Earth Observation," U.S. Appl. No. 61/911,914, filed Dec. 4, 2013, 177 pages.
Ma, "Application of RADARSAT-2 Polarimetric Data for Land Use and Land Cover Classification and Crop Monitoring in Southwestern Ontario," master's thesis, The University of Western Ontario, Canada, 2013, 145 pages.
Maciejewski et al., "Systems and Methods for Processing and Providing Video," U.S. Appl. No. 62/011,935, filed Jun. 13, 2014, 52 pages.
Makar et al., "Real-Time Video Streaming With Interactive Region-of-Interest," Proceedings of 2010 IEEE $17^{th}$ International Conference on Image Processing, Hong Kong, China, Sep. 26-29, 2010, pp. 4437-4440.
Meilland et al., "A Unified Rolling Shutter and Motion Blur Model for 3D Visual Registration," IEEE International Conference on Computer Vision, Sydney, Australia, Dec. 1-8, 2013, pp. 2016-2023.
National Instruments, "Direct Digital Synthesis," white paper, Dec. 30, 2016, 5 pages.
Notice of Allowance, dated Mar. 9, 2017, for U.S. Appl. No. 15/101,344, Beckett et al., "Systems and Methods for Processing and Distributing Earth Observation Images," 9 pages.
Notice of Allowance, dated October 18, 2018, for U.S. Appl. No. 15/316,469, Maciejewski et al., "Systems and Methods for Processing and Providing Terrestrial and/or Space-Based Earth Observation Video," 8 pages.
Office Action, dated Apr. 23, 2018, for U.S. Appl. No. 15/316,469, Maciejewski et al., "Systems and Methods for Processing and Providing Terrestrial and/or Space-Based Earth Observation Video," 21 pages.
Office Action, dated Aug. 6, 2018, for U.S. Appl. No. 15/101,336, Lopez et al., "Systems and Methods for Earth Observation," 25 pages.
Office Action, dated Feb. 11, 2019, for U.S. Appl. No. 15/502,468, Fox, "Apparatus and Methods for Quad-Polarized Synthetic Aperture Radar," 42 pages.
Pleskachevsky et al., "Synergy and fusion of optical and synthetic aperture radar satellite data for underwater topography estimation in coastal areas," Ocean Dynamics 61(12):2099-2120, 2011.
Preliminary Amendment, filed Dec. 15, 2017, for U.S. Appl. No. 15/737,044, Beckett et al., "Systems and Methods for Enhancing Synthetic Aperture Radar Imagery," 10 pages.
Preliminary Amendment, filed December 5. 2016, for U.S. Appl. No. 15/316,469, Maciejewski et al., "Systems and Methods for Processing and Providing Terrestrial and/or Space-Based Earth Observation Video," 9 pages.
Preliminary Amendment, filed June 2. 2016, for U.S. Appl. No. 15/101,336, Lopez et al., "Systems and Methods for Earth Observation," 9 pages.
Preliminary Amendment, filed Jun. 2, 2016, for U.S. Application No. 15/101,344, Beckett et al., "Systems and Methods for Processing and Distributing Earth Observation Images," 11 pages.
Preliminary Amendment, filed May 22, 2018, for U.S. Appl. No. 15/778,188. Fox, "Synthetic Aperture Radar Imaging Apparatus and Methods," 9 pages.
Raouf et al., "Integrated Use of SAR and Optical Data for Coastal Zone Management," Proceedings of the $3^{rd}$ European Remote Sensing Symposium vol. 2, Florence, Italy, Mar. 14-21, 1997, pp. 1089-1094.
Richardson, "By the Doppler's sharp stare," Oct. 1, 2003, Armada International, URL=https://www.thefreelibrary.com/_/print/PrintArticle.aspx?id=111508265, download date Oct. 8, 2018, 7 pages.
Rosen et al., "Techniques and Tools for Estimating Ionospheric Effects in Interferometric and Polarimetric SAR Data," International Geoscience and Remote Sensing Symposium, Vancouver, British Columbia, Canada, Jul. 24-29, 2011, pp. 1501-1504.
Rossler, "Adaptive Radar with Application to Joint Communication and Synthetic Aperture Radar (CoSAR)," doctoral dissertation, The Ohio State University, Columbus, Ohio, USA, 2013, 117 pages.
Sano et al., "Synthetic Aperture Radar (L band) and Optical Vegetation Indices for Discriminating the Brazilian Savanna Physiognomies: A Comparative Analysis," Earth Interactions 9(15)05, 2005. (15 pages).
Šindelář et al., "A Smartphone Application for Removing Handshake Blur and Compensating Rolling Shutter," IEEE International Conference on Image Processing, Paris, France, Oct. 27-30, 2014, pp. 2160-2162.
Šindelář et al., "Image deblurring in smartphone devices using built-in inertial measurement sensors," Journal of Electronic Imaging 22(1):011003, 2013. (22 pages).
Stofan et al., "Overview of Results of Spaceborne Imaging Radar-C, X-Band Synthetic Aperture Radar (SIR-C/X-SAR)," IEEE Transactions on Geoscience and Remote Sensing 33(4):817-828, 1995.
Stralka, "Applications of Orthogonal Frequency-Division Multiplexing (OFDM) to Radar," doctoral dissertaion, Johns Hopkins University, Baltimore, Maryland, USA, Mar. 2008, 196 pages.
Tyc, "Systems and Methods for Remote Sensing of the Earth From Space," U.S. Appl. No. 62/180,440, filed Jun. 16, 2015, 29 pages.
Wall et al., "User Guide to the Magellan Synthetic Aperture Radar Images," Jet Propulsion Laboratory, Pasadena, California, USA, Mar. 1995, 210 pages.
Wu et al., "Simultaneous transmit and receive polarimetric synthetic aperture radar based on digital beamforming," $4^{th}$ International Conference on Mechatronics, Materials, Chemistry and Computer Engineering, Xi'an, China, Dec. 12-13, 2015, pp. 1283-1288.

(56) References Cited

OTHER PUBLICATIONS

Xia et al., "Classification of High Resolution Optical and SAR Fusion Image Using Fuzzy Knowledge and Object-Oriented Paradigm," Geographic Object-Based Image Analysis vol. XXXVIII-4/C7, Ghent, Belgium, Jun. 29-Jul. 2, 2010, 5 pages.

Office Action from related U.S. Appl. No. 16/616,362, dated Mar. 10, 2022.

Canadian Office Action from related matter 2,980,920, dated Mar. 15, 2020.

* cited by examiner

SYNTHETIC APERTURE RADAR IMAGING APPARATUS AND METHODS FOR MOVING TARGETS

CROSS-REFERENCE TO RELATED APPLICATIONS

This present application is a National Phase Application Filed Under 35 U.S.C. 371 claiming priority to PCT/US2018/034146 filed May 23, 2018, which in turn claims priority from U.S. Provisional Application Ser. No. 62/510,191 filed May 23, 2017, the entire disclosures of which are incorporated herein by reference.

BACKGROUND

Technical Field

The present application relates generally to synthetic aperture radar (SAR) and, more particularly, to operating modes suitable for estimating the velocity of a moving target.

Description of the Related Art

A synthetic aperture radar (SAR) is an imaging radar. The SAR exploits the relative motion of the radar and a target of interest to obtain high azimuthal resolution. The SAR is typically flown on an aircraft, a spacecraft, unmanned aerial vehicle (UAV) such as a drone, or another suitable platform. The target of interest is typically on the ground (e.g. on land, water, ice or snow), and can be a point target or a distributed target. The SAR can be a component of a SAR imaging system, the system also including at least one of data processing and data distribution components.

In conventional operation of a SAR imaging system, the system is tasked to obtain images of a target or a swath. Data is collected on-board the platform. In the case of a spaceborne SAR, the data is collected on-board the spacecraft, and either processed on-board the spacecraft and downlinked to the ground, or downlinked and processed on the ground to generate the images. The images are distributed to the user, typically via a network. In some implementations, the main elements of a space-borne SAR platform can include:

Satellite Platform: includes the following subsystems and units: Structure, Power, On-board Data Handling, a Payload Data Handling Unit, Telemetry and Telecommands;
  Communications (TT&C), X-Band High-rate Downlink, Attitude and Orbit Control subsystem, Thermal Control, and Propulsion;
SAR Instrument; and/or
A SAR Processing Unit: performs onboard SAR data processing.

BRIEF SUMMARY

Some embodiments of SAR systems can incorporate the following advanced SAR features into a single SAR instrument:
  a shared aperture;
  multi-aperture (e.g., in one implementation, six apertures for a SAR operating at X-band, three apertures for a SAR operating at L-band);
  digital beam-forming (with multiple beams in elevation and azimuth);
  quad-polarization and compact polarization; and/or
  modular multi-aperture technology with digital interfaces of SAR Data.

In the case of a dual-band SAR, the SAR can have simultaneous dual-frequency capability (e.g., L-band and X-band).

SAR systems can include multiple digital and RF components. In some implementations, a SAR system includes a SAR antenna, sensor electronics, and Transmit Receive Modules (TRMs) mounted on an antenna panel.

A SAR Processing Unit (SPU) can be part of an On-Board Data Handling subsystem. The SPU may house processing boards, power boards, cabling, and an associated backplane. Each processing board in the SPU can include multiple ultra-high performance FPGA boards, for example, that can perform real-time processing tasks. The processing functions performed by the SPU can include the following:
  on-board SAR Data Processing;
  target detection; and/or
  compression/packetization/encryption/forward error correction encoding for communications links.

A method of operation of a synthetic aperture radar (SAR) system to estimate the velocity of a moving target may be summarized as including a dual-beam SAR antenna, a SAR transceiver and a SAR data processor, the SAR transceiver communicatively coupled to the dual-beam SAR antenna and to the SAR data processor; the method including directing a first radar beam to illuminate the moving target in a region on a surface of the Earth by the dual-beam SAR antenna; directing a second radar beam to illuminate the moving target by the dual-beam SAR antenna, the second radar beam at an angular offset relative to the first radar beam; transmitting pulses and receiving backscattered energy simultaneously via the first and second radar beams by the SAR transceiver; generating, by the SAR data processor, a first image from the first radar beam and a second image from the second radar beam; co-registering the first and the second images by the SAR data processor; comparing, by the SAR data processor, the location of the moving target in the first image and the second image; and estimating, by the SAR data processor, a velocity of the moving target based at least in part on the angular offset. Directing a first radar beam to illuminate the moving target may include directing a forward-looking radar beam to illuminate the moving target, and directing a second radar beam to illuminate the moving target may include directing an aft-looking radar beam to illuminate the moving target. Directing a first radar beam to illuminate the moving target may include directing a radar beam comprising a main lobe of an antenna beam pattern to illuminate the moving target, and directing a second radar beam to illuminate the moving target may include directing a radar beam comprising a grating sidelobe of the antenna beam pattern to illuminate the moving target. Directing a radar beam including a main lobe of an antenna beam pattern to illuminate the moving target and directing a radar beam including a grating sidelobe of the antenna beam pattern to illuminate the moving target may include applying a phase ramp across an aperture of the dual-beam SAR antenna. Applying a phase ramp across an aperture of the dual-beam SAR antenna may include causing a magnitude of the grating sidelobe of the antenna beam pattern to be approximately the same as a magnitude of the main lobe of the antenna beam pattern.

The method may further include forming two or more elevation beams; and generating a SAR image with multi-looking in range. Transmitting pulses and receiving backscattered energy simultaneously via the first and second radar beams by the SAR transceiver may include transmitting pulses and receiving backscattered energy in a ScanSAR imaging mode.

A synthetic aperture radar (SAR) system may be summarized as including a SAR platform including at least one SAR antenna; and at least one processor; and at least one nontransitory processor-readable medium communicatively coupled to the at least one processor which stores at least one of processor-executable instructions or data which, when executed by the at least one processor, may cause the at least one processor to perform any of the above methods.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
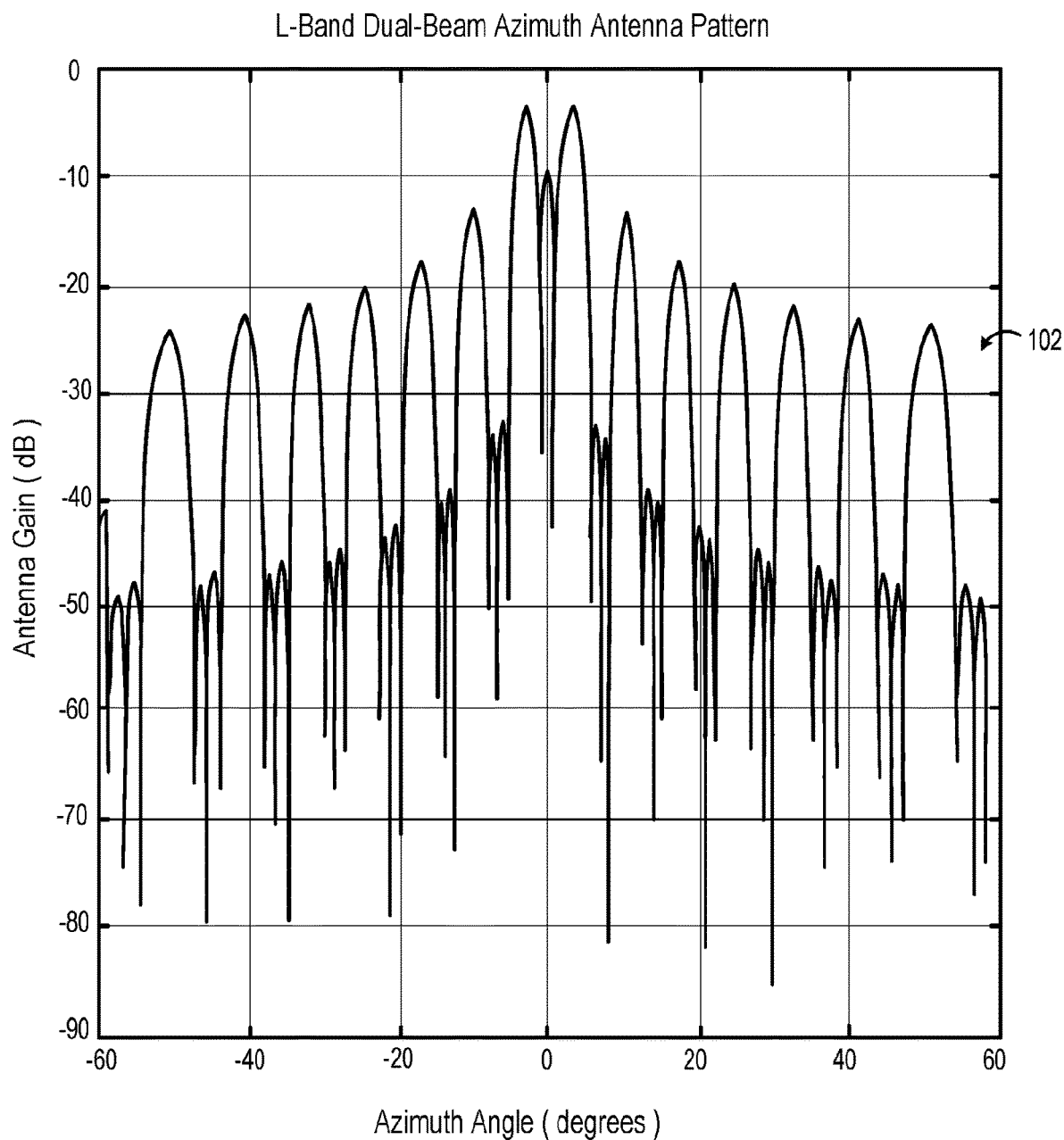
FIG. 1 is a graph of an example dual-beam azimuth antenna pattern at L-band, in accordance with the systems and methods of the present application.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The Abstract of the Disclosure provided herein is for convenience only and does not interpret the scope or meaning of the embodiments.

Different imaging modes for a SAR are described below. Particular emphasis is given to wide-swath and ultra-high resolution modes, surveillance modes that can be used for target detection, and experimental modes that include very small target detection and target velocity estimation modes. The surveillance and experimental modes can be used, in particular, for maritime surveillance, for example where the targets are ships.

SAR-XL Imaging Modes—StripMap Imaging and ScanSAR

StripMap imaging mode: SAR can use a single fixed beam with a single aperture to acquire a continuous image strip.

ScanSAR imaging mode: SAR can use electronic beam steering to periodically switch within a set of adjacent beams which are later processed into a wide continuous swath at a lower resolution as compared to StripMap.

In a dual-band SAR, StripMap image modes can be available in X-, L- or simultaneous X- and L-band, and, in some implementations, in a variety of transmit and receive polarizations including quad-polarization (HH, VV, HV, and VH, where H is horizontal polarization and V is vertical polarization). In StripMap modes, the image resolution typically varies from 1.0 m to 20 m, and the swath width typically varies from 7.5 km to 50 km, depending on the specific mode. These modes can provide high image quality in terms of conventional image quality metrics, e.g., NESZ (Noise Equivalent Sigma Zero), Range Ambiguity to Signal Ratio (RASR) and Azimuth Ambiguity to Signal Ratio (AASR).

A conventional ScanSAR mode typically uses multiple beams to get a wider swath width than the StripMap modes. The swath width can vary from 100 km to 500 km depending on incidence angle, with a 30 m resolution.

SAR Imaging Modes—Surveillance Modes

The flexibility of advanced SAR systems can enable the generation of application-specific modes unavailable in conventional less-advanced SAR systems. For example, enhanced ScanSAR modes can be tailored specifically for target detection (e.g., watercraft, ship, or vehicle detection), and can provide almost uniform target detection performance across an accessible area. For example, in the case of maritime surveillance, modes can be tailored specifically for ship detection, and can provide almost uniform target detection performance with a Minimum Detectable Ship Length (MDSL) of 25 m or better across an accessible area.

In some implementations, an advanced SAR system includes a dual-band SAR, i.e., a SAR operable to generate SAR images at two different frequency bands. In some implementations of a dual-band SAR, enhanced ScanSAR modes tailored specifically for target detection can include two L-band modes and three X-band modes that collectively can provide access to a ground range swath of between 150 km off-nadir to 575 km off-nadir.

In some implementations, L-band modes can be tailored for maritime surveillance and ship detection in near-range, and can utilize HV cross-polarization for improved clutter suppression covering incidence angles of 19.7 degrees to 45.2 degrees. HV cross-polarized images can be generated by including transmitting radar pulses in horizontal (H) polarization and receiving backscattered radar pulses in vertical (V) polarization. X-band modes can take advantage of additional X-band antenna gain and wider bandwidth. In an example implementation of a dual-band XL (X-band and L-band) SAR system, X-band modes can cover incidence angles from 31.0 degrees to 55.5 degrees. Examples of various target detection modes for a dual-band XL SAR are tabulated below in Table 1. Other suitable modes can be constructed.

TABLE 1

Example Dual-Band SAR Target Detection
ScanSAR Modes Characteristics

| | Band | Pol | Ground Start (km) | Ground End (km) | Swath Width (km) | Number of Beams |
|---|---|---|---|---|---|---|
| SD Mode A | L-Band | HV | 150 | 378 | 228 | 4 |
| SD Mode B | L-Band | HV | 200 | 410 | 210 | 5 |
| SD Mode C | X-Band | VV | 250 | 455 | 205 | 8 |
| SD Mode D | X-Band | VV | 300 | 533 | 233 | 8 |
| SD Mode E | X-Band | VV | 350 | 575 | 225 | 8 |

SAR beam modes can be tuned to suit a particular surveillance scenario. For example, modes can be tuned to suit maritime surveillance based at least in part on an understanding of the effects of different beam choices on the likely detectability of vessels in cluttered and noisy SAR imagery.

For example, a model can be built for ship detectability that may include inputs such as any one or more of the following:
frequency band (e.g., L or X);
polarization (HH, VV, HV or VH);
sea state (e.g., 3 or 5);
wind direction relative to beam (e.g., an angle between 0° to 90°);
incidence angle (e.g., from 20° to 60°);
K-distribution shape parameter (e.g., 4, as in RD-1);
effective number of independent looks (e.g., 2 or 4);
probability of false alarm (e.g., $10^{-9}$ or $10^{-6}$);
probability of detection (e.g., 90% or 80%); and/or
NESZ, azimuth and ground-range resolutions of the SAR beam(s) at the given incidence angle(s).

The output of the modeling can be, for example, a Minimum Detectable Ship Length (MDSL), for which the computed probability of detection is above a threshold value, and the backscattered power in a given frequency band and polarization is above a threshold value for the probability of false alarm of K-distributed sea clutter under ocean conditions specified in the inputs to the model.

Target Velocity Estimation Approach

In one example scenario, the systems and methods described in the present application can be used for maritime surveillance. The SAR system can use a wide-swath SAR imaging mode such as a ScanSAR mode, and can process the wide-swath SAR data, on-board or on the ground, to detect moving targets (e.g., ships and other watercraft) and estimate their velocity (e.g., speed and heading). In other scenarios, the systems and methods described in the present application can be used to detect land, snow, or ice-based targets, and estimate their velocity.

To estimate the velocity of watercraft, vehicles, and other moving targets, special beams can be developed within the SAR modes identified above. An operational approach for using these special beams can include a dual-beam SAR imaging approach for measuring target motion directly (i.e., from an analysis of the dual-beam SAR images).

In some implementations, a SAR antenna consists of multiple azimuth phase centers. Each of the multiple phase centers has sensor electronics that can control the phase of signals being fed to radiating elements of the SAR antenna. A phase ramp can be applied across an antenna aperture to steer an antenna beam. The extent to which the antenna beam can be steered can be limited by the beam pattern of a single antenna phase center. As the beam is steered towards the edge of the beam pattern of the single antenna phase center, a grating lobe can appear, and the grating lobe can become larger relative to the main lobe the more the beam is steered.

An azimuth beam can be steered to an angle at which the gain of the grating lobe is approximately the same magnitude as the gain of the main lobe, for example by steering the azimuth beam by a steering angle of one half of the beam width of a single azimuth phase center, as follows:

$$\theta = 0.5 \times 0.886 \times \lambda / A$$

where $\lambda$ is a wavelength of illumination, and $A$ is an azimuth dimension of an azimuth phase center.

In one example implementation, at X-band, $A=1$ m, and $\theta=0.8°$, and at L-band, $A=2$ m, and $\theta=3.0°$. The grating lobe appears at the negative of this angle, and the separation between the beams is approximately twice this angle.

A SAR in dual-beam operation can transmit and receive simultaneously through both beams, albeit at half the antenna gain relative to a single-beam system. Data can be simultaneously received from both forward-looking and aft-looking beams, for example. The two beams can have an angular offset between one another. In one implementation, one beam is forward of a broadside direction relative to a ground track of the SAR and another beam is aft of the broadside direction. In one implementation, two beams are both forward of a broadside direction, one beam more forward than the other. In one implementation, two beams are both aft of a broadside direction, one beam more aft than the other. In some implementations, a first beam is in a broadside side direction and a second beam is either forward or aft of the first beam. In the present application, the most forward-looking beam of the two beams is referred to as a forward-looking beam, and the other beam of the two beams is referred to as an aft-looking beam.

A SAR processor can generate separate images from the SAR data received from each beam. When processing the SAR data from a first beam of the two beams, signals from a second beam of the two beams can appear as an interference to the first beam, but signals from the second beam will not focus at least in part because range walk in the second beam is in the opposite direction to range walk in the first beam. Range walk is an effect in which a moving target may straddle more than one range cell during a single coherent processing time interval.

Using a dual-beam approach described in the present application, an aft-looking beam can illuminate a region on the Earth's surface that overlaps at least a portion of a region illuminated by a forward-looking beam, at a later time than the at least a portion of the region was illuminated by the forward-looking beam. The images formed by the forward-looking and the aft-looking beams are offset in time from one another. In some implementations, the offset in time (also referred to in the present application as the time offset) can be several seconds. When the two images of the overlapping area are co-registered, and the locations of the same target in the overlapping area are compared, the time offset can be sufficient to provide information about the motion of a target that is detected in both images. For example, the two images can be co-registered and analyzed to determine an estimate of a velocity (e.g., speed and heading) of the target.

The systems and methods described in the present application can include forming one or more images of a target or region on the Earth's surface, for example, on land, water, snow or ice. Targets can include point targets and distributed targets. Targets can include stationary targets and moving targets. Targets can include vehicles, ships, submarines, and other man-made objects.

FIG. 1 is a graph 100 of an example dual-beam azimuth antenna pattern 102 at L-band, in accordance with the systems and methods of the present application.

At a slant range of approximately 500 km, an angular offset between the two beams of ±3.0° can correspond to a distance of approximately ±26 km. The SAR antenna on a spaceborne platform in a low Earth orbit can take approximately 7.2 s to travel that distance, during which time a target travelling at a speed of 10 m/s can travel approximately 72 m. The time offset can provide sufficient time to measure a speed and heading of the target.

An accuracy of a velocity estimate (denoted by $\sigma_v$), derived from a relative position shift in the SAR images, as a function of a positioning error $\sigma_m$, and a time offset T between the measurements, can be expressed as follows:

$$\sigma_v = \sqrt{2} \times \sigma_m / T$$

Accuracy of the measurement can depend, at least in part, on a SAR resolution, which can, in turn, depend on characteristics of a ScanSAR mode used to acquire the SAR data. For example, accuracy of the measurement can depend on the number of elevation beams used, and on use of multi-looking. In some implementations, a higher accuracy and improved results can be achieved by using range multi-looking.

Typically, a SAR with resolution ($\rho$) can be lead to a positioning error of:

$$\sigma_m = \rho / \sqrt{12}$$

For example, an L-band ScanSAR mode with a resolution of 10 m can lead to a positioning error of approximately 2.9 m, and a velocity estimation error of approximately 0.6 m/s. The positioning error can be in the along-track and the across-track direction.

In some implementations, the positioning error can be improved. For example, a zero-padded Fast Fourier Transform (FFT) can be used, in some cases in combination with other processing methods, to improve the accuracy with which a target can be located by finding the location of a scattering center within a resolution cell.

Figure 2:
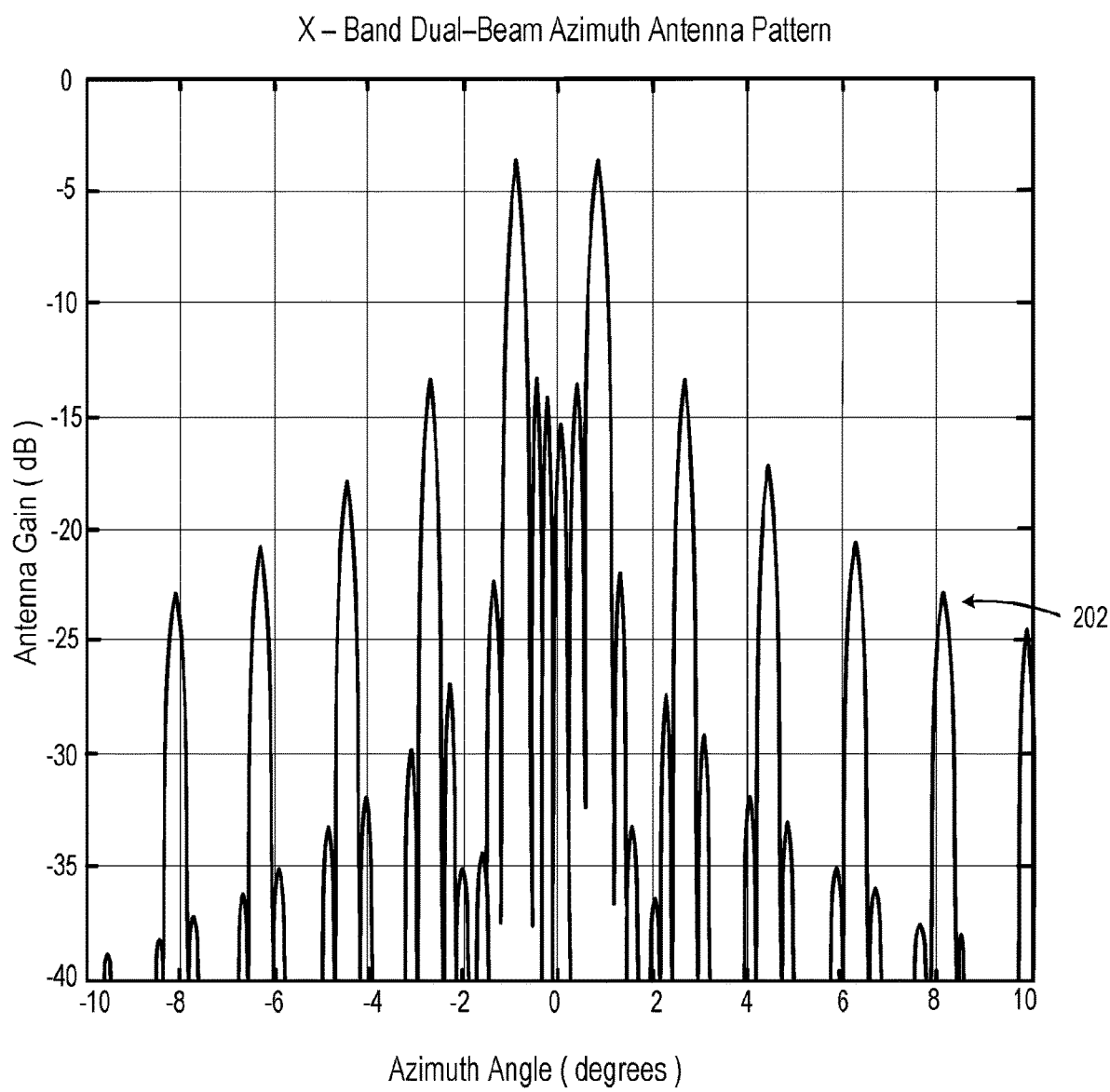
FIG. 2 is a graph of an example dual-beam azimuth antenna pattern at X-band, in accordance with the systems and methods of the present application.

FIG. 2 is a graph 200 of an example dual-beam azimuth antenna pattern 202 at X-band, in accordance with the systems and methods of the present application.

At a slant range of approximately 500 km, an angular offset between the two beams of ±0.8° can correspond to a distance of approximately ±7 km. The SAR antenna on a spaceborne platform in a low Earth orbit can take approximately 1.9 s to travel that distance, during which time a 10 m/s target can travel approximately 19 m.

An X-band ScanSAR mode with a resolution of 10 m can lead to a positioning error of approximately 2.9 m, and a velocity estimation error of approximately 2.2 m/s. In one implementation, the radial component of the velocity estimate is improved by fusing a velocity estimate derived using the technology described above with a radial velocity estimate derived from a conventional method such as Along-Track Interferometry (ATI).

While use of a dual-beam system, as described above, can result in a loss in antenna gain of 3 dB on both transmit and receive, the loss applies equally to both target and clutter. So, in the case of a clutter limited performance, there is no overall change to performance resulting from the 3 dB loss in antenna gain.

Though use of a dual-beam system, as described above, can increase a clutter level by a factor of two causing a 3 dB degradation, the degradation can be offset by other factors. For example, by using both beams of the dual-beam system to detect a target, a dual-beam system can have an improved false alarm rate. The false alarm can be improved by the dual-beam approach over conventional approaches by a factor of a square root. For example, if the single-beam false alarm rate is $10^{-10}$, the dual-beam false alarm rate can be of the order of $10^{-5}$ to achieve approximately the same overall false target rate. Similarly, the probability of detection for the dual-beam can be 0.95 to achieve a two-out-of-two detection probability of 0.9.

Figure 3:
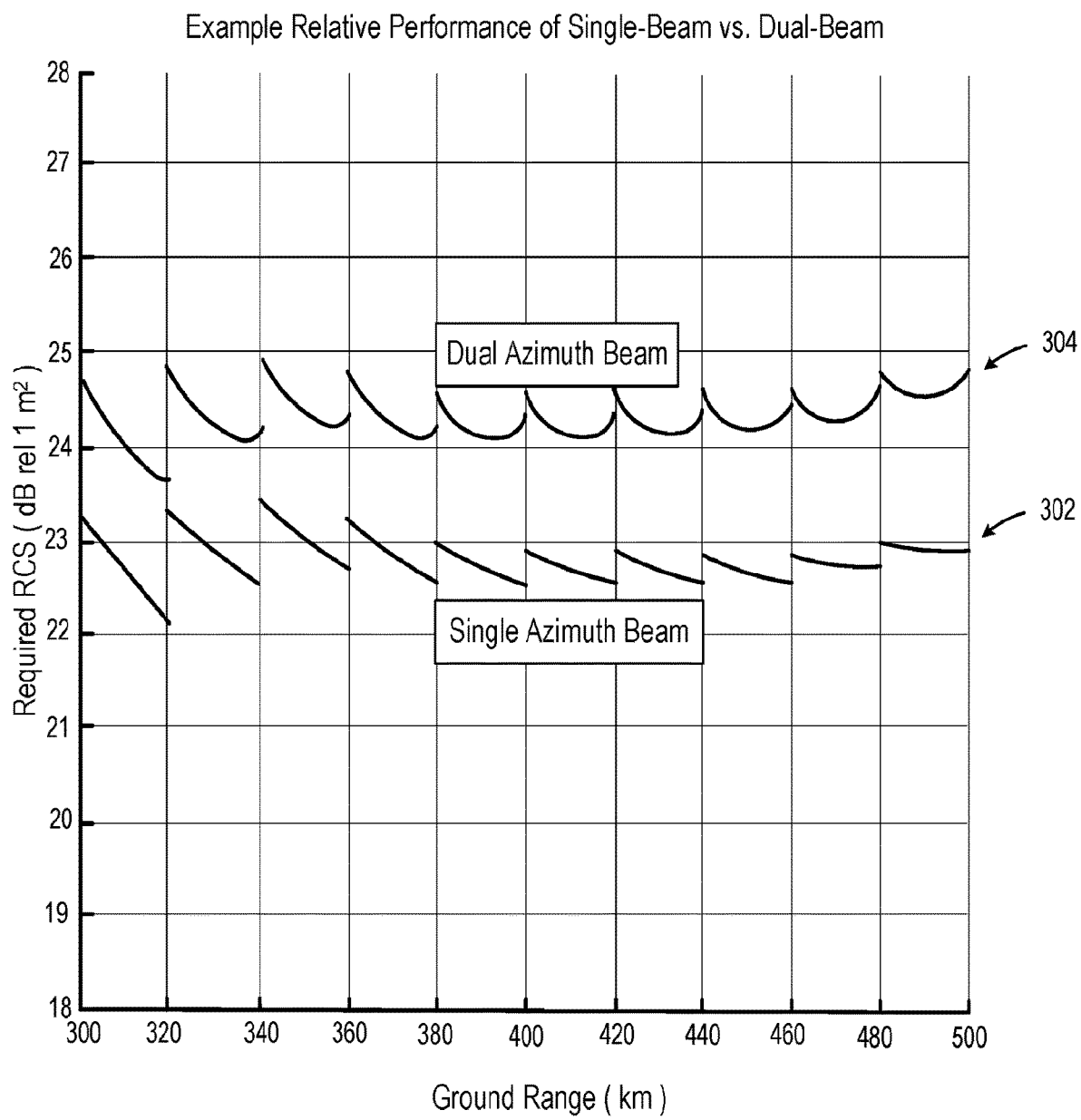
FIG. 3 is a graph of relative performance of single-beam and dual-beam SAR systems, in accordance with the systems and methods of the present application.

FIG. 3 is a graph 300 of relative performance of single-beam and dual-beam SAR systems, according to the present disclosure. Graph 300 includes a single-beam plot 302 of required radar cross-section (RCS) for a probability of detection of 0.9 versus ground range, and a dual-beam plot 304 of required radar cross-section (RCS) for a probability of detection of 0.9 versus ground range. Graph 300 can be generated by simulation, for example.

As shown in FIG. 3, an overall loss in detection of a dual-beam system (also referred to in the present application as a dual azimuth beam system) compared to a single-beam system (also referred to in the present application as a single azimuth beam system) can be of the order of 2 dB, in a clutter-limited case. The loss in detection can increase the Minimum Detectable Ship Length (MDSL) by approximately 25%. For example, in the case of a ScanSAR mode with a MDSL capability of 16 m with a single azimuth beam, performance can be degraded to a MDSL of 20 m with a dual azimuth beam. A benefit of a dual azimuth beam system is that it can provide a direct measurement of both target speed and heading.

Though in a noise-limited case a loss between single-beam and dual-beam can be of the order 4 dB, detection performance for the noise-limited case can be better than for a clutter-limited case, and the additional performance margin afforded by the better detection performance can generally be able to absorb the loss.

One approach to avoiding a performance penalty that could, for example, result in an increase in the MDSL by 25%, is to adjust the characteristics of the SAR beams to maintain the MDSL performance capability at the expense of SAR swath width.

Starting from the ScanSAR modes described in Table 1, a new set of beams was developed to maintain an MDSL of 25 m while reducing the SAR swath width to 150 km for each of the ScanSAR modes. The new set of beams is referred to in the present application as dual-azimuth target detection Scan SAR modes, and are described in Table 2 (below). An estimated velocity error for the L-band modes is 0.6 m/s (across-track and along-track). An estimated velocity error for the X-band modes is 2.2 m/s (across-track and along-track).

TABLE 2

Dual-Azimuth Target Detection ScanSAR Mode Characteristics

| | Band | Pol | Ground Start (km) | Ground End (km) | Swath Width (km) | Number of Beams |
|---|---|---|---|---|---|---|
| SD Mode A | L-Band | HV | 200 | 350 | 150 | 3 |
| SD Mode B | L-Band | HV | 250 | 400 | 150 | 3 |

TABLE 2-continued

Dual-Azimuth Target Detection ScanSAR Mode Characteristics

|  | Band | Pol | Ground Start (km) | Ground End (km) | Swath Width (km) | Number of Beams |
|---|---|---|---|---|---|---|
| SD Mode C | X-Band | VV | 300 | 450 | 150 | 5 |
| SD Mode D | X-Band | VV | 350 | 500 | 150 | 5 |
| SD Mode E | X-Band | VV | 425 | 575 | 150 | 5 |

While the systems and methods described in the present application are particularly suited to maritime surveillance and ship detection and velocity estimation, the systems and methods described in the present application can apply to SAR surveillance more generally, including surveillance of water, land, snow, and ice, and to moving target detection of watercraft, vehicles, and other moving targets.

A method for estimating the velocity of a moving target according to the present disclosure can include the following acts:

a) directing a first radar beam to illuminate a moving target in a region on a surface of the Earth by a dual-beam SAR antenna;

b) directing a second radar beam to illuminate the moving target by the dual-beam SAR antenna where the second radar beam is at an angular offset from the first radar beam;

c) transmitting radar pulses and receiving backscattered energy simultaneously via the first and second radar beams by the SAR transceiver;

d) generating, by the SAR data processor, a first image from the first radar beam and a second image from the second radar beam;

e) co-registering the first and the second images by the SAR data processor;

f) comparing, by the SAR data processor, the location of the moving target in the first image and the second image;

g) estimating, by the SAR data processor, a velocity of the moving target based at least in part on the angular offset between the first and the second radar beams. The angular offset between the first and the second beam can result in a time offset between the first and the second image, which can cause a moving target to appear at different locations in the first and the second image.

Figure 4:
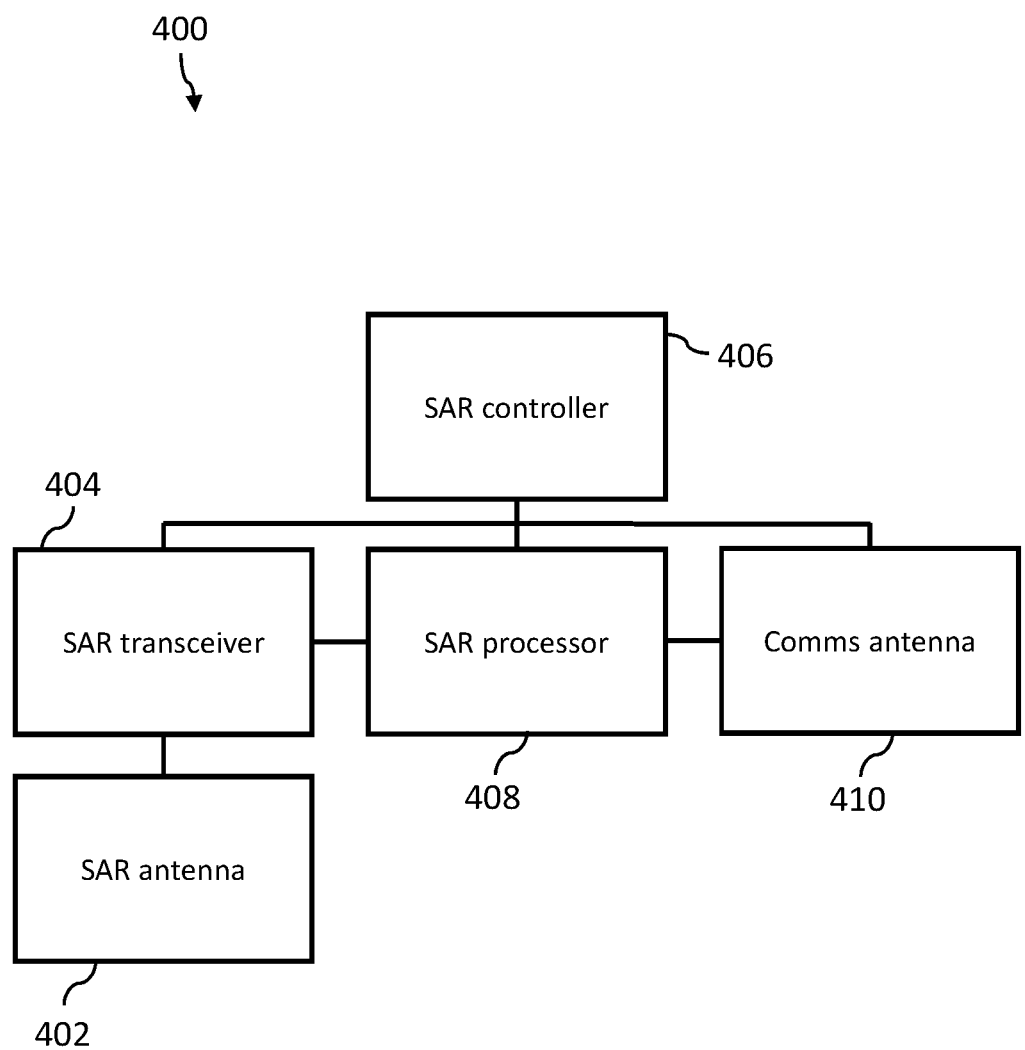
FIG. 4 is a block diagram of an example SAR system, in accordance with the systems and methods of the present application.

FIG. 4 is a block diagram of an example SAR system 400, in accordance with the systems and methods of the present application. SAR system 400 can be a multi-band SAR system, for example a dual-band XL SAR system. SAR system 400 can be on-board a SAR platform such as an aircraft or spacecraft. SAR system 400 comprises a SAR antenna 402, a SAR transceiver 404, a SAR controller 406, a SAR processor 408 (e.g., hardware circuitry), and a communications antenna 410.

SAR antenna 402 can be a shared aperture antenna. SAR antenna 402 can be a planar phased array such as described in International Patent Application Publication WO 2017/044168 entitled "EFFICIENT PLANAR PHASED ARRAY ANTENNA ASSEMBLY", for example. SAR antenna 402 can be bi-directionally communicatively coupled to SAR transceiver 404. SAR transceiver 404 can be bi-directionally communicatively coupled to data processor 408 and optionally to a data storage (not shown in FIG. 4). SAR transceiver 404 can include one or more transceiver circuits, for example operable to transmit pulses and receive returned pulses in respective ones of two or more different frequency bands via one or more antenna such as SAR antenna 402. The transceiver circuits can, for example be commonly housed or on a common circuit board, or housed individually or on respective individual circuit boards. In some implementations, SAR transceiver 404 includes, or consists of, a separate transmitter and receiver, commonly housed or separately housed.

SAR antenna 402 is communicatively coupled to transceiver 404. SAR transceiver 404 can transmit and receive pulses at one or more frequency bands. In some implementations, SAR transceiver is a dual-band SAR transceiver, and can transmit and receive pulses at two frequency bands, for example at X-band and L-band. In some implementations, SAR transceiver 404 can transmit and receive pulses at two or more frequency bands at the same time. The pulses can be synchronized with each other.

SAR transceiver 404 can transmit and receive pulses for one or more imaging modes such as ScanSAR mode and strip-map mode. SAR transceiver 504 can transmit and receive pulses in one or more beams, and in one or more sub-beams. In one example, SAR transceiver 404 transmits and receives L-band pulses in a wide-swath SAR imaging mode, and transmits and receives X-band pulses in a high-resolution imaging mode at the same time (i.e., within the same acquisition window).

SAR controller 406 can comprise one or more processors. SAR controller 406 can include at least one of a Field-Programmable Gate Array (FPGA), an Application Specific Integrated Circuit (ASIC), a microcontroller, and a microprocessor, and one or more programs or firmware stored on one or more nontransitory computer- or processor-readable media.

SAR processor 408 can process SAR data acquired by SAR antenna 402 and SAR transceiver 404. SAR processor 408 can process data in real-time or near-real-time. SAR processor 408 can perform one or more of a variety of processing tasks that may include range compression, azimuth compression, target detection and identification, chip extraction, velocity estimation, and image classification. SAR processor 408 can process data for one or more imaging modes of SAR system 400, for example SAR processor 408 can process one or more of wide-swath ScanSAR mode data, Strip-map mode data, high-resolution Strip-map, and Spotlight mode data.

Communications antenna 410 can transmit and receive data, for example communications antenna 410 can transmit acquired SAR data, processed SAR targets, target detections, identifications, and/or image classifications from SAR system 400 to a ground terminal. Communications antenna 410 can receive commands and/or ancillary data from a ground terminal. The ground terminal (not shown in FIG. 4) can include a communications antenna and a transceiver.

Figure 5:
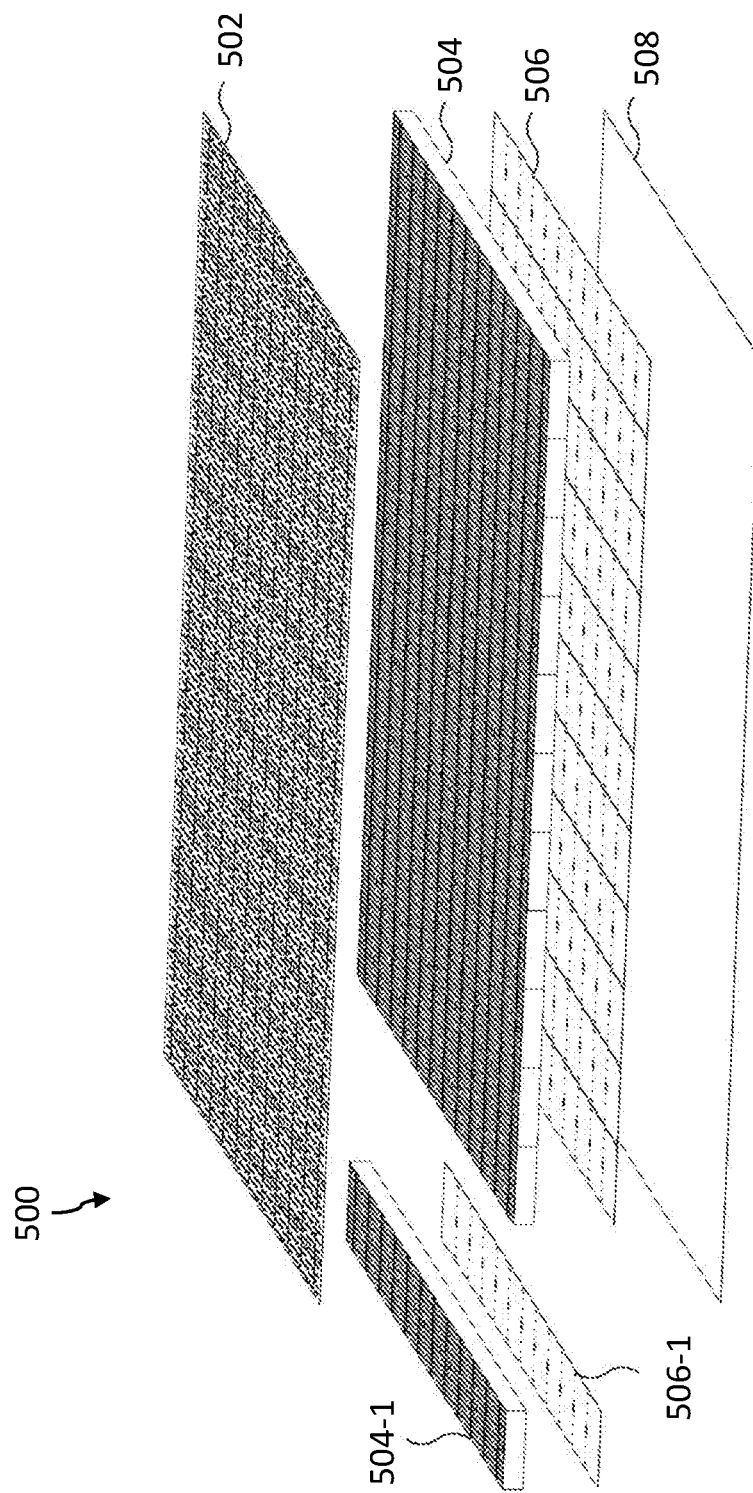
FIG. 5 is an isometric view of a SAR antenna in the form of a planar phased array antenna assembly, in accordance with the systems and methods described in the present application.

FIG. 5 is an isometric view of a SAR antenna in the form of a planar phased array antenna assembly 500, in accordance with the systems and methods described in the present application. The size of planar phased array antenna assembly 500 can be tailored to meet the gain and bandwidth requirements of a particular application. An example application is a dual-band, dual-polarization SAR antenna. A dual-band SAR antenna can operate at L-band and X-band, for example. A dual-polarization SAR antenna can transmit and receive horizontal (H) and vertical (V) polarizations for example.

In an example implementation of a dual-band, dual-polarization SAR antenna, assembly 500 is approximately 2.15 m wide, 1.55 m long and 50 mm deep, and weighs approximately 30 kg. In another implementation, SAR antenna comprises a single panel of dimensions 6 m by 2 m.

In yet another implementation, SAR antenna 502 comprises six panels, each panel of dimensions 1 m by 2 m.

While some embodiments described in this document relate to dual X-band and L-band SAR antennas, and the technology is particularly suitable for space-based SAR antennas for reasons described elsewhere in this document, a similar approach can also be adopted for other frequencies, polarizations, configurations, and applications including, but not limited to, single-band and multi-band SAR antennas at different frequencies, and microwave and mm-wave communication antennas.

Antenna assembly 500 comprises a first face sheet 502 on a top surface of antenna assembly 500, containing slots for the L-band and X-band radiating elements. Antenna assembly 500 comprises microwave structure 504 below first face sheet 502. Microwave structure 504 comprises one or more subarrays such as subarray 504-1, each subarray comprising L-band and X-band radiating elements.

Microwave structure 504 can be a metal structure that is self-supporting without a separate structural subassembly. Microwave structure 504 can be machined or fabricated from one or more metal blocks, such as aluminum blocks or blocks of another suitable conductive material. The choice of material for microwave structure 504 determines, at least in part, the losses and therefore the efficiency of the antenna.

Antenna assembly 502 comprises second face sheet 506 below microwave structure 504, second face sheet 506 closing one or more L-band cavities at the back. Second face sheet 506 comprises one or more sub-array face sheets such as 506-1.

Antenna assembly 500 comprises third face sheet 508 below second face sheet 506, third face sheet 508 comprising waveguide terminations. Third face sheet 508 also provides at least partial structural support for antenna assembly 500.

In some implementations, antenna assembly 500 comprises a multi-layer printed circuit board (PCB) (not shown in FIG. 5) below third face sheet 508, the PCB housing a corporate feed network for the X-band and L-band radiating elements.

The various embodiments described above can be combined to provide further embodiments. The contents of provisional application U.S. Ser. No. 62/510,182 entitled "SYSTEMS AND METHODS FOR A SYNTHETIC APERTURE RADAR WITH MULTI-APERTURE ANTENNA", filed on May 23, 2017 and listing as inventors Peter Fox and Stephen Lilley; the contents of International Patent Application Publication WO 2017/044168 entitled "EFFICIENT PLANAR PHASED ARRAY ANTENNA ASSEMBLY", and the contents of provisional application U.S. Ser. No. 62/510,191 entitled "SYNTHETIC APERTURE RADAR IMAGING APPARATUS AND METHODS FOR MOVING TARGETS", filed on May 23, 2017 are each incorporated herein by reference in their entirety. Aspects of the embodiments can be modified, if necessary, to employ systems, circuits and concepts of the various patents, applications and publications to provide yet further embodiments.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

While particular elements, embodiments and applications of the present technology have been shown and described, it will be understood, that the technology is not limited thereto since modifications can be made by those skilled in the art without departing from the scope of the present disclosure, particularly in light of the foregoing teachings.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operation of a synthetic aperture radar (SAR) system to estimate the velocity of a moving target, the SAR system comprising:
   a dual-beam SAR antenna, a SAR transceiver and a SAR data processor, the SAR transceiver communicatively coupled to the dual-beam SAR antenna and to the SAR data processor;
   the method comprising:
   directing a first radar beam to illuminate the moving target in a region on a surface of the Earth by the dual-beam SAR antenna;
   directing a second radar beam to illuminate the moving target by the dual-beam SAR antenna, the second radar beam at an angular offset relative to the first radar beam;
   transmitting pulses and receiving backscattered energy simultaneously via the first and second radar beams by the SAR transceiver;
   generating, by the SAR data processor, a first image from the first radar beam and a second image from the second radar beam;
   co-registering the first and the second images by the SAR data processor;
   comparing, by the SAR data processor, the location of the moving target in the first image and the second image; and
   estimating, by the SAR data processor, a velocity of the moving target based at least in part on the angular offset.

2. The method of claim 1 wherein directing a first radar beam to illuminate the moving target includes directing a forward-looking radar beam to illuminate the moving target, and directing a second radar beam to illuminate the moving target includes directing an aft-looking radar beam to illuminate the moving target.

3. The method of claim 1 wherein directing a first radar beam to illuminate the moving target includes directing a radar beam comprising a main lobe of an antenna beam pattern to illuminate the moving target, and directing a second radar beam to illuminate the moving target includes directing a radar beam comprising a grating sidelobe of the antenna beam pattern to illuminate the moving target.

4. The method of claim 3 wherein directing a radar beam comprising a main lobe of an antenna beam pattern to illuminate the moving target and directing a radar beam comprising a grating sidelobe of the antenna beam pattern to illuminate the moving target includes applying a phase ramp across an aperture of the dual-beam SAR antenna.

5. The method of claim 4 wherein applying a phase ramp across an aperture of the dual-beam SAR antenna includes causing a magnitude of the grating sidelobe of the antenna beam pattern to be approximately the same as a magnitude of the main lobe of the antenna beam pattern.

6. The method of claim 1, further comprising:
forming two or more elevation beams; and
generating a SAR image with multi-looking in range.

7. The method of claim 1 wherein transmitting pulses and receiving backscattered energy simultaneously via the first and second radar beams by the SAR transceiver includes transmitting pulses and receiving backscattered energy in a ScanSAR imaging mode.

8. A synthetic aperture radar (SAR) system, comprising:
a SAR platform that includes at least one dual-beam SAR antenna, the at least one dual-beam SAR antenna to:
generate a first radar beam to illuminate a moving target in a region on a surface of the Earth; and
generate a second radar beam to illuminate the moving target, the second radar beam at an angular offset relative to the first radar beam;
a SAR transceiver coupled to the at least one dual-beam SAR antenna, the SAR transceiver to:
transmit one or more pulses and receive backscattered energy simultaneously via the first and second radar beams; and
at least one SAR data processor coupled to the SAR transceiver; and
at least one nontransitory processor-readable medium communicatively coupled to the at least one SAR data processor which stores at least one of processor-executable instructions or data which, when executed by the at least one SAR data processor, causes the at least one SAR data processor to:
generate a first image from the first radar beam and a second image from the second radar beam;
co-register the first and the second images;
compare the location of the moving target in the first image and the second image; and
estimate a velocity of the moving target based at least in part on the angular offset.

9. The SAR system of claim 8:
wherein to generate a first radar beam to illuminate a moving target in a region on a surface of the Earth the at least one dual-beam SAR antenna to further: direct a forward-looking radar beam to illuminate the moving target; and
wherein to generate a second radar beam to illuminate the moving target, the at least one dual-beam SAR antenna to further: direct an aft-looking radar beam to illuminate the moving target.

10. The SAR system of claim 8:
wherein to generate a first radar beam to illuminate a moving target in a region on a surface of the Earth, the at least one dual-beam SAR antenna to further:
direct a radar beam comprising a main lobe of an antenna beam pattern to illuminate the moving target; and
wherein to generate a second radar beam to illuminate the moving target, the at least one dual-beam SAR antenna to further:
direct a radar beam comprising a grating sidelobe of the antenna beam pattern to illuminate the moving target.

11. The SAR system of claim 10 wherein to direct the radar beam comprising the main lobe of the antenna beam pattern to illuminate the moving target and direct the radar beam comprising the grating sidelobe of the antenna beam pattern to illuminate the moving target, the at least one dual-beam SAR antenna to further:
apply a phase ramp across an aperture of the at least one dual-beam SAR antenna.

12. The SAR system of claim 11 wherein to apply the phase ramp across the aperture of the at least one dual-beam SAR antenna, the at least one dual-beam SAR antenna to further:
cause a magnitude of the grating sidelobe of the antenna beam pattern to be approximately the same as a magnitude of the main lobe of the antenna beam pattern.

13. The SAR system of claim 8, the at least one dual-beam SAR antenna to further:
form two or more elevation beams; and
wherein the at least one nontransitory processor-readable medium further includes instructions that cause the at least one SAR data processor to:
generate a SAR image with multi-looking in range.

14. The SAR system of claim 8 wherein to transmit pulses and receive backscattered energy simultaneously via the first and second radar beams, the SAR transceiver to further:
transmit pulses and receive backscattered energy in a ScanSAR imaging mode.

* * * * *